(12) United States Patent
Suzuki et al.

(10) Patent No.: US 9,189,301 B2
(45) Date of Patent: Nov. 17, 2015

(54) DATA PROCESSING METHOD AND DATA PROCESSING SYSTEM

(71) Applicant: FUJITSU LIMITED, Kawasaki-shi, Kanagawa (JP)

(72) Inventors: Takahisa Suzuki, Yokohama (JP); Koichiro Yamashita, Hachioji (JP); Hiromasa Yamauchi, Kawasaki (JP); Koji Kurihara, Kawasaki (JP); Toshiya Otomo, Kawasaki (JP); Naoki Odate, Akiruno (JP)

(73) Assignee: FUJITSU LIMITED, Kawasaki (JP)

( * ) Notice: Subject to any disclaimer, the term of this patent is extended or adjusted under 35 U.S.C. 154(b) by 52 days.

(21) Appl. No.: 14/085,141

(22) Filed: Nov. 20, 2013

(65) Prior Publication Data
US 2014/0082637 A1 Mar. 20, 2014

Related U.S. Application Data

(63) Continuation of application No. PCT/JP2011/061896, filed on May 24, 2011.

(51) Int. Cl.
G06F 9/46 (2006.01)
G06F 9/54 (2006.01)
G06F 9/52 (2006.01)

(52) U.S. Cl.
CPC ............... *G06F 9/542* (2013.01); *G06F 9/528* (2013.01)

(58) Field of Classification Search
CPC .................................................. G06F 9/4881
USPC ................................................. 718/102, 103
See application file for complete search history.

(56) References Cited

U.S. PATENT DOCUMENTS

| 8,438,572 | B2* | 5/2013 | Fecioru ........................ 718/103 |
| 2002/0129038 | A1* | 9/2002 | Cunningham ................ 707/200 |
| 2003/0103564 | A1 | 6/2003 | Hanaki |
| 2003/0104828 | A1 | 6/2003 | Nguyen |
| 2011/0276968 | A1* | 11/2011 | Kand et al. ................... 718/102 |

FOREIGN PATENT DOCUMENTS

| JP | 59-123944 | 7/1984 |
| JP | 2-144657 | 6/1990 |

(Continued)

OTHER PUBLICATIONS

International Search Report mailed Aug. 2, 2011 in corresponding International Application No. PCT/JP2011/061896.

(Continued)

*Primary Examiner* — Andy Ho
(74) *Attorney, Agent, or Firm* — Staas & Halsey LLP

(57) ABSTRACT

A data processing method executed by a first data processing apparatus and includes acquiring process information concerning a first process, in response to a process request for the first process; setting a first process flag included in the process information concerning the first process to indicate "true"; setting a first end flag of the process information concerning the first process to indicate "true" after executing the first process; acquiring process information concerning a second process that is to be executed before a third process that is to be executed subsequent the first process; and determining a process to be executed, based on a second process flag and a second end flag included in the process information concerning the second process.

12 Claims, 25 Drawing Sheets

(56) References Cited

FOREIGN PATENT DOCUMENTS

| JP | 8-83110 | 3/1996 |
| JP | 2003-235083 | 8/2003 |
| JP | 2003-244699 | 8/2003 |
| JP | 2005-316679 | 11/2005 |
| JP | 2006-201896 | 8/2006 |
| JP | 2009-230590 | 10/2009 |

OTHER PUBLICATIONS

International Preliminary Report on Patentability issued Dec. 5, 2013 in corresponding International Patent Application No. PCT/JP2011/061896.

Japanese Office Action issued Apr. 14, 2015 in corresponding Japanese Patent Application No. 2013-516111.

Japanese Office Action dated Jan. 13, 2015 in corresponding Japanese Patent Application No. 2013-516111.

* cited by examiner

DATA PROCESSING METHOD AND DATA
PROCESSING SYSTEM

CROSS REFERENCE TO RELATED
APPLICATIONS

This application is a continuation application of International Application PCT/JP2011/061896, filed on May 24, 2011 and designating the U.S., the entire contents of which are incorporated herein by reference.

FIELD

The embodiments discussed herein are related to a data processing method and a data processing system.

BACKGROUND

According to a conventional network system, a client node makes an inquiry to another node group about processing performance and an intention to participate; based on the response from the other node group, determines nodes capable of accepting job processing; distributes and requests execution of the job; and totals the results of the job processing. According to another network system that includes many subscribers, a processor unit, and a switching device executing communication between the subscribers and the processor unit, is equipped with a distributed processing processor unit that enables each of processors in the processor unit to be accessed (see, for example, Japanese Laid-Open Patent Publication Nos. 2006-201896 and 2003-235083).

However, in the case of a system that executes parallel processing using terminals capable of wireless communication, when a terminal moves, the state of objects that momentarily block signals varies. As a result, communication quality may be degraded. For example, even when the communication quality is excellent at the start of the parallel processing, during the parallel processing: the communication quality may be degraded; communication may take a significant amount of time and may not be able to be continued. In this state, problems arise in that a tremendous amount of time is consumed for the parallel processing to be completed and the parallel processing may not be able to be completed.

SUMMARY

According to an aspect of an embodiment, a data processing method is executed by a first data processing apparatus and includes acquiring process information concerning a first process, in response to a process request for the first process; setting a first process flag included in the process information concerning the first process to indicate "true"; setting a first end flag of the process information concerning the first process to indicate "true" after executing the first process; acquiring process information concerning a second process that is to be executed before a third process that is to be executed subsequent the first process; and determining a process to be executed, based on a second process flag and a second end flag included in the process information concerning the second process.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Embodiments of a data processing method and a data processing system will be described in detail with reference to the accompanying drawings. According to the data processing method and the data processing system, a data processing apparatus acquires process information concerning a second process that is to be executed before a third process that is to be executed subsequent to a first process; and executes the third process based on a second process flag included in the process information concerning the second process. The present invention is not limited to this embodiment.

Figure 1:
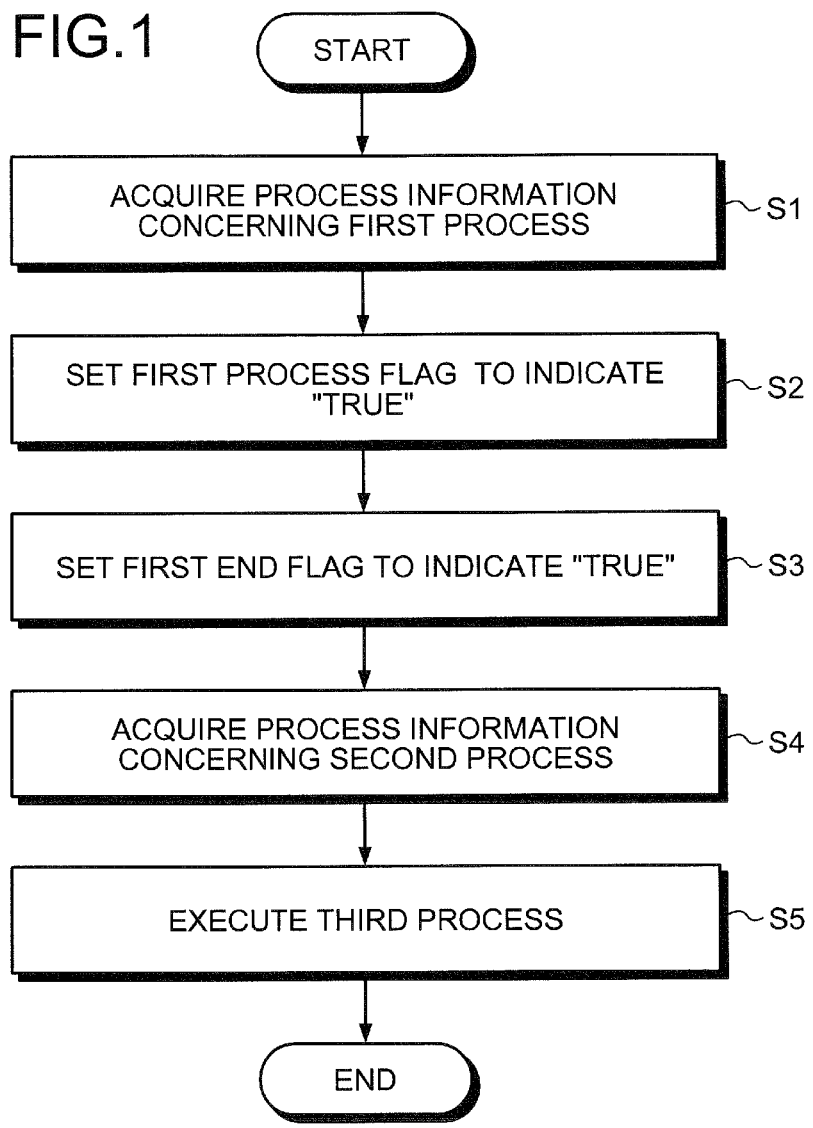
FIG. 1 is a flowchart of a data processing method according to a first embodiment.

FIG. 1 is a flowchart of a data processing method according to a first embodiment. As depicted in FIG. 1, when data processing is started, a data processing apparatus (first data processing apparatus) acquires process information concerning the first process, in response to a process request for a first process (step S1).

The data processing apparatus sets a first process flag to indicate "true" (step S2). The first process flag is included in the process information concerning the first process. The data processing apparatus executes the first process.

After executing the first process, the data processing apparatus sets a first end flag to indicate "true" (step S3). The first end flag is included in the process information concerning the first process.

The data processing apparatus acquires process information concerning the second process (step S4). The data processing apparatus is originally set to execute a third process following the first process. If the data processing apparatus executes the second process, the second process is executed before the third process.

The data processing apparatus executes the third process based on the second process flag (step S5). The second process flag is included in the process information concerning the second process. The data processing apparatus causes the series of process steps of the data process to come to an end.

According to the first embodiment, during a standby period from the time when execution of the first process ends until the time when execution of the third process starts by the data processing apparatus whose processing speed is high, the data processing apparatus can speculatively execute the second process to be executed by another data processing apparatus whose processing speed is low. Therefore, parallel processing can be executed promptly using the plural data processing apparatuses. When parallel processing is executed using terminals capable of wireless communication as the data processing apparatuses, a terminal whose communication quality is excellent can speculatively execute the second process assigned to another terminal whose communication quality drops during the time period while the terminal waits for the start of the execution of the third process. Therefore, the parallel processing can be executed promptly using the plural terminals.

A second embodiment is an example where the data processing method according to the first embodiment is applied to loop parallel processing that employs barrier synchronization in a mobile telephone system using a terminal such as a mobile telephone as the first data processing apparatus. An example of the terminal can be a mobile information terminal such as a mobile gaming device or a personal digital assistant (PDA) capable of wireless communication, in addition to the mobile telephone.

Figure 2:
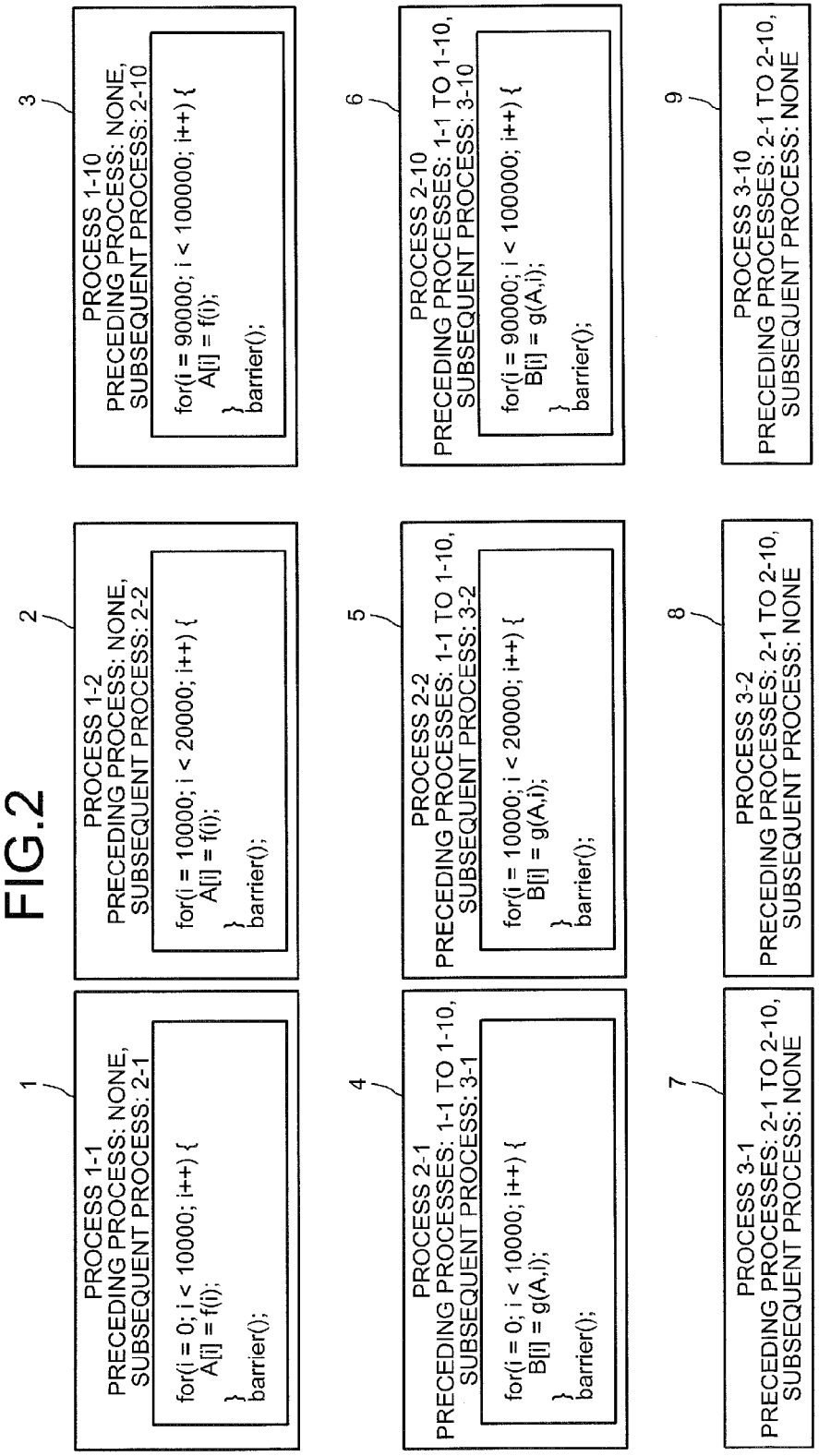
FIG. 2 is an explanatory schematic diagram of loop parallel processing employing barrier synchronization.

FIG. 2 is an explanatory schematic diagram of loop parallel processing employing barrier synchronization. FIG. 2 depicts an example where a pre-stage loop process and a post-stage loop process are each divided into, for example, 10 partial loop processes whose iterations have no dependency among each other and, for example, 10 terminals process the partial loop processes in parallel.

In FIG. 2, a "process m-n" represents an m-th stage partial loop process processed by an n-th terminal. Therefore, processes 1-1, 1-2, . . . , and 1-10 are each processed by a terminal that is different from that of each other. Processes 1-1, 2-1, and 3-1 are processes by the same terminal. Neither the number of the divided pre-stage loop processes nor the number of the divided post-stage loop processes are limited to 10, and may be arbitrary.

In the example depicted in FIG. 2, it is assumed that the post-stage loop process uses all of data in an arrangement A that is output by the pre-stage loop process. Therefore, a function (barrier( )) to execute the barrier process is inserted at the tail of a program code of each of the pre-stage partial loop processes (1-1 to 1-10) 1, 2, and 3. Thereby, the post-stage partial loop processes (2-1 to 2-10) 4, 5, and 6 are started after all the pre-stage partial loop processes (1-1 to 1-10) 1, 2, and 3 come to an end.

Final-stage processes (3-1 to 3-10) 7, 8, and 9 represent anchors of the processes by the terminals. A function (barrier( )) to execute the barrier process is inserted at the tail of a program code of each of the post-stage partial loop processes 4, 5, and 6 (2-1 to 2-10). Therefore, the final-stage processes (3-1 to 3-10) 7, 8, and 9 are started after all the post-stage partial loop processes (2-1 to 2-10) 4, 5, and 6 come to an end.

Figure 3:
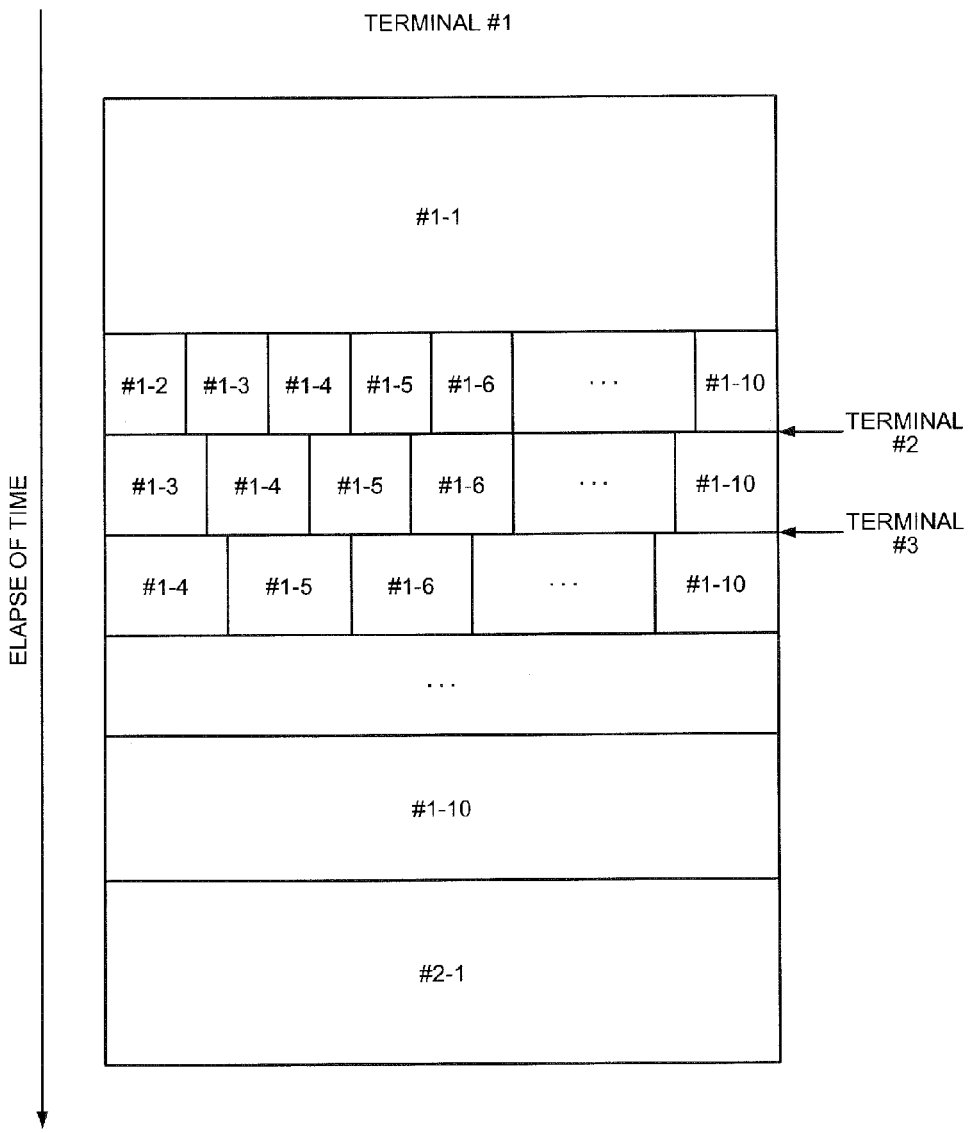
FIG. 3 is an explanatory schematic diagram of a data processing method according to a second embodiment.

FIG. 3 is an explanatory schematic diagram of a data processing method according to the second embodiment. As depicted in FIG. 3, when plural terminals, for example, 10 terminals execute parallel processing, a terminal #1 executes a pre-stage partial loop process #1-1 assigned to the terminal #1. After the execution of the pre-stage partial loop process #1-1 comes to an end, the terminal #1 speculatively executes pre-stage partial loop processes #1-2, #1-3, . . . respectively assigned to other terminals #2, #3, . . . as independent threads by the time slice execution.

The terminal #1 receives process results from the other terminals #2, #3, . . . and cancels execution of threads corresponding to the received process results. When the terminal #1 receives the process results from the other terminals #2, #3, . . . or the pre-stage partial loop processes #1-2, #1-3, . . . come to an end as the threads speculatively executed by the terminal #1 and thereby, the results of all the pre-stage partial loop processes are finally collected by the terminal #1, the terminal #1 starts execution of a post-stage partial loop process #2-1 assigned to the terminal #1.

Figure 4:
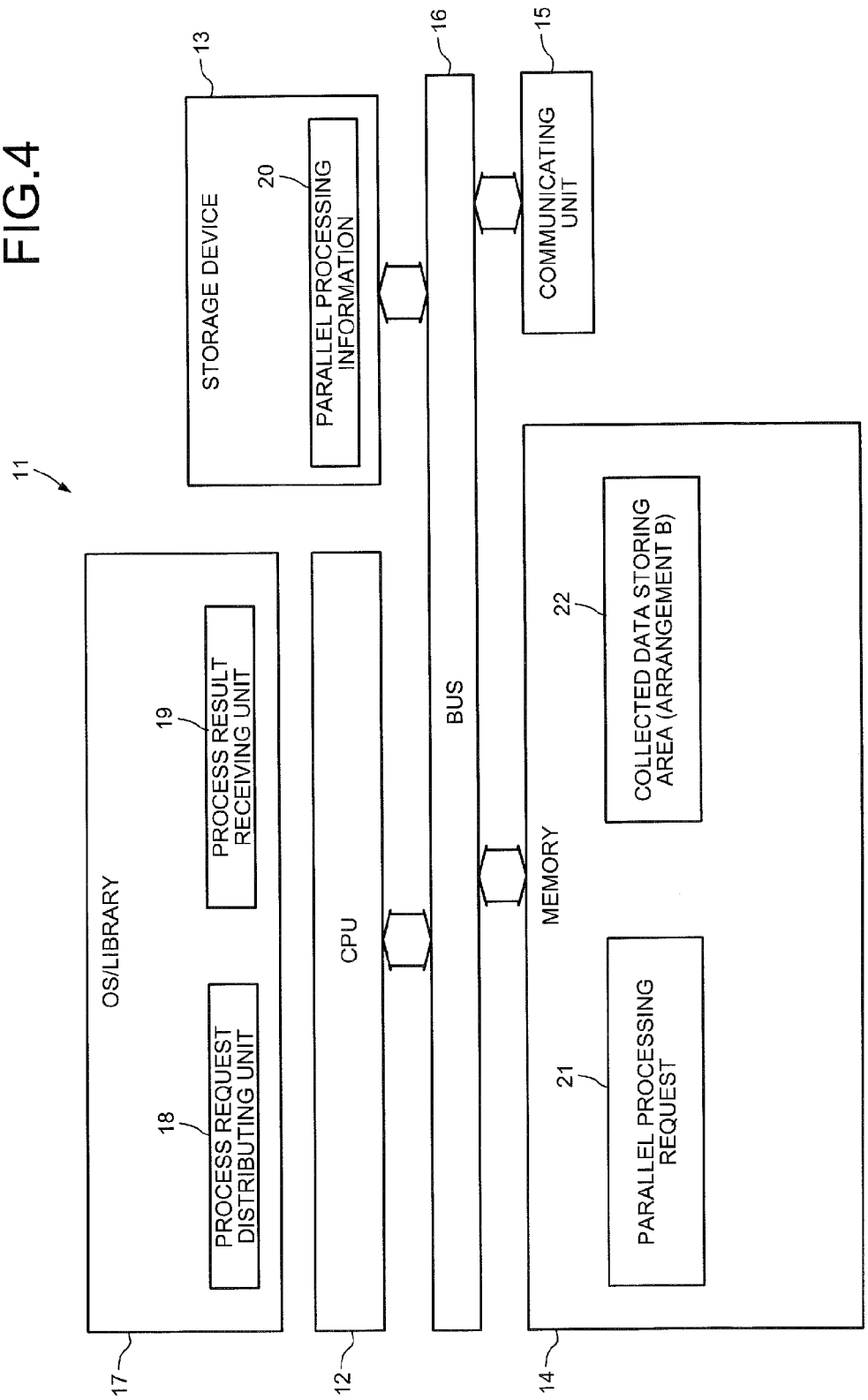
FIG. 4 is a block diagram of a base station according to the second embodiment.

FIG. 4 is a block diagram of a base station according to the second embodiment. As depicted in FIG. 4, the base station 11 includes, for example, a central processing unit (CPU) 12; a storage device 13; a storage unit such as, for example, memory 14; and a communicating unit 15, respectively connected to a bus 16.

The CPU 12 executes an operating system (OS) and a library 17. The CPU 12 executes the OS and the library 17 and thereby, a process request transmitting unit such as, for example, a process request distributing unit 18 is implemented and a process result receiving unit such as, for example, a process result receiving unit 19 is implemented. The CPU 12 executes various types of application programs.

The process request distributing unit 18 controls the parallel processing overall and executes a process of distributing a process request to request execution of a process, to the plural terminals. The operation of the process request distributing unit 18 will be described later as an operation executed when the parallel processing is started by the base station. The process result receiving unit 19 executes a process executed when the execution results of the processes are received from the terminals. The operation of the process result receiving unit 19 will be described later as an operation executed when the process results are received by the base station.

The storage device 13 stores parallel processing information 20 that is generated in advance by the program generator. The parallel processing information 20 will be described later. An example of the storage device 13 may be a nonvolatile storing apparatus such as, for example, a read only memory (ROM), a hard disk (HD), and magnetic tape.

The memory 14 is used as, for example, a work area of the CPU 12. In the memory 14, a parallel processing request 21 and a collected data storing area 22 are expanded. The parallel processing request 21 is a request formed by expanding the parallel processing request included in the parallel processing information 20 described later. The memory 14 has a process flag indicating current execution of a process, an end flag indicating an end of the execution of the process, and information indicating the terminal executing the process stored therein as a part of data of the parallel processing request 21, correlated with the process. In the example depicted in FIG. 2, a storage area of the arrangement B is expanded as the collected data storing area 22. An example of the memory 14 may be, for example, random access memory (RAM).

The communicating unit 15 is connected to a mobile telephone network by wireless communication, and transmits and receives, for example, packets to and from the terminals.

Figure 5:
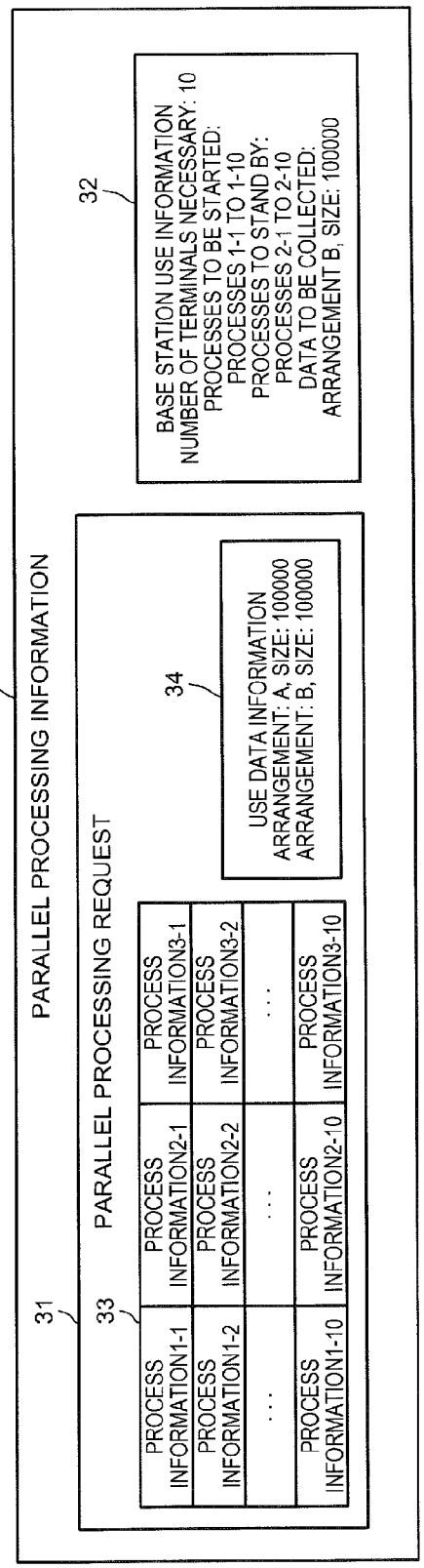
FIG. 5 is a schematic diagram of an example of parallel processing information according to the second embodiment.

FIG. 5 is a schematic diagram of an example of the parallel processing information according to the second embodiment. As depicted in FIG. 5, the parallel processing information 20 includes a parallel processing request 31 and base station use information 32. The parallel processing request 31 includes process information 33 and use data information 34. The process information 33 is set for each of the partial loop processes divided for the plural stages and the plural terminals. The use data information 34 includes information concerning a data area such as the data size, that is necessary when the plural terminals execute the parallel processing.

The base station use information 32 includes information used by the base station. The base station use information 32 includes information concerning, for example, the number of terminals that execute the parallel processing (the number of terminals necessary); the process for which the parallel processing is started (the process to be started), the process to be executed that is the subsequent process in the parallel processing (the process standing by), and the data to be collected as the results of the parallel processing (data to be collected).

An example will be described of the parallel processing information 20 corresponding to, for example, the example depicted in FIG. 2. The process information 33 is set for each of, for example, the pre-stage partial loop processes 1, 2, and 3 of the processes 1-1 to 1-10; the post-stage partial loop processes 4, 5, and 6 of the processes 2-1 to 2-10; and the final-stage processes 7, 8, and 9 of the processes 3-1 to 3-10.

The use data information 34 includes, for example, information indicating "A" as the arrangement name, "100000" as the data size of the arrangement A, "B" as the arrangement name, and "100000" as the data size of the arrangement B. When an initial value is set for the data, the parallel processing request 31 may include the initial value of the data.

The base station use information 32 includes information indicating, for example that the number of terminals necessary is 10, that the processes to be started are the processes 1-1 to 1-10, that the processes standing by are the processes 2-1 to 2-10, and that the data to be collected is data having a data size of 100000 of the arrangement B.

Figure 6:
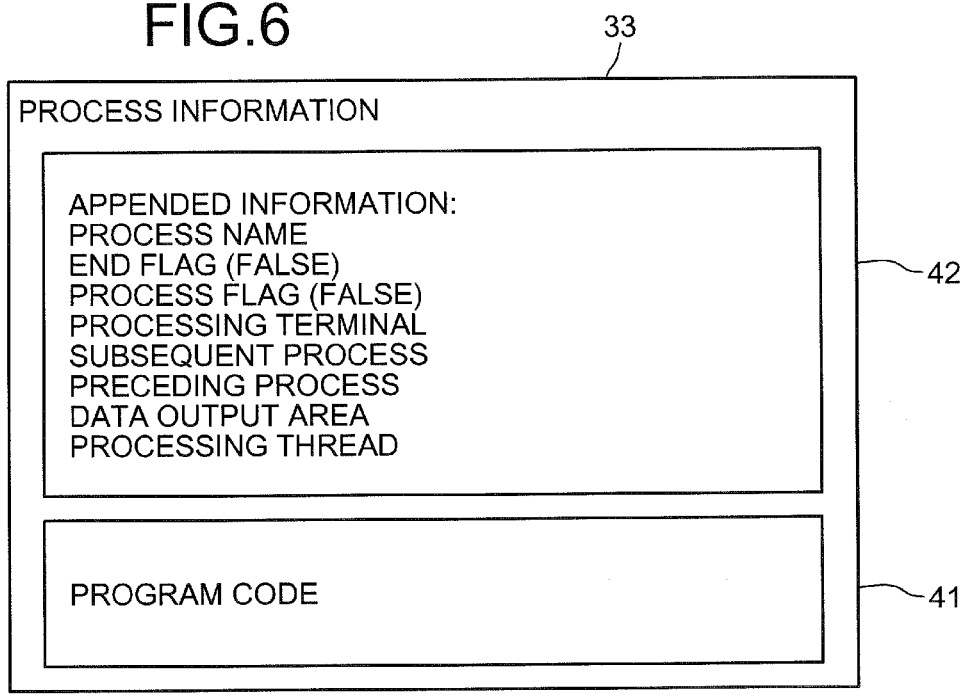
FIG. 6 is a schematic diagram of an example of process information according to the second embodiment.

FIG. 6 is a schematic diagram of an example of the process information according to the second embodiment. As depicted in FIG. 6, the process information 33 on each of the partial loop processes includes program code 41 that corresponds to a partial loop process and appended information 42 that is used for the parallel processing. The program code 41 is set in advance by the program generator.

The appended information 42 has fields for the process name, the end flag, the process flag, the processing terminal, the subsequent process, the preceding process, the data output area, and the processing thread. Among these fields, the program generator preliminarily sets data in the fields for the process name, the subsequent process, the preceding process, and the data output area. An initial value is preliminarily set in the fields for the end flag and the process flag. The initial value of each of the flags may be, for example, "false".

When execution of all the preceding processes described in the process information 33 comes to an end, a terminal can start execution of the program code 41 described in the process information 33. When the terminal completes the execution of the program code 41 described in the process information 33, the terminal can start execution of the subsequent process described in the process information 33 or can stand by for the start of the execution. The data output area field is set to a range of the data output as a process result from the corresponding partial loop process.

An example will be described of the process information 33 corresponding to, for example, the example depicted in FIG. 2. The process name field has the processes 1-1, 1-2, etc., set therein. No preceding process is present for any of the processes 1-1 to 1-10 and therefore, the preceding process field has "null" set therein. For the process 1-1, the subsequent process is the process 2-1 and therefore, the process 2-1 is set in the subsequent process field. For the process 1-1, a range of elements from "0" to "9999" of the arrangement A is set in the data output area field. The same is applied to each of the processes 1-2 to 1-10.

For the process 2-1, the preceding processes are all of the processes 1-1 to 1-10 and therefore, the processes 1-1 to 1-10 are set in the preceding process field. For the process 2-1, the subsequent process is the process 3-1 and therefore, the process 3-1 is set in the subsequent process field. The same is applied to each of the processes 2-2 to 2-10.

For the process 3-1, the preceding processes are all of the processes 2-1 to 2-10 and therefore, the processes 2-1 to 2-10 are set in the preceding process field. The same is applied to the processes 3-2 to 3-10. For the processes 3-1 to 3-10, no subsequent process is present and therefore, "null" is set in the subsequent process field. For the processes 3-1 to 3-10, the program code 41 is not described in the process information 33. No substantially operation is executed for the processes 3-1 to 3-10. The setting of the processes 3-1 to 3-10 enables the terminals to speculatively execute the processes 2-1 to 2-10.

Figure 7:
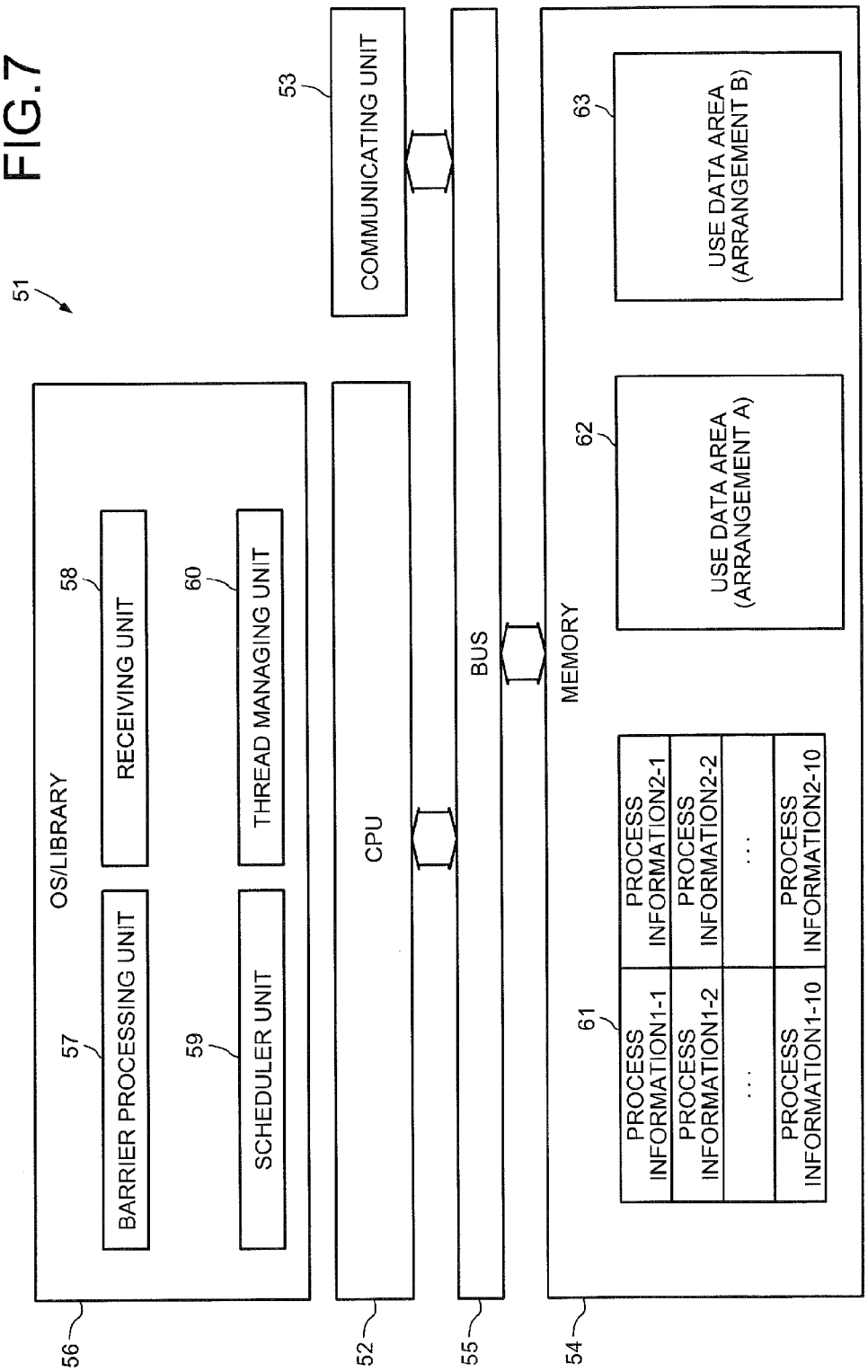
FIG. 7 is a block diagram of a terminal according to the second embodiment.

FIG. 7 is a block diagram of the terminal according to the second embodiment. As depicted in FIG. 7, the terminal 51 includes, for example, a CPU 52, a communicating unit 53, and memory 54. The CPU 52, the communicating unit 53, and the memory 54 are connected to a bus 55.

The CPU 52 executes an OS and a library 56. The CPU 52 executes the OS and the library 56 and thereby, for example, a barrier processing unit 57 and a receiving unit 58 as an example of a receiving unit and a processing unit are implemented. The receiving unit 58 responds to a process request and acquires process information that corresponds to the process request. The receiving unit 58 sets the process flag that is included in the acquired process information to indicate "true". The operation of the receiving unit 58 will be described later as an operation executed when the parallel processing request is received by the terminal and that is executed when the process result is received.

The barrier processing unit 57 sets the end flag of the process information corresponding to the process after the execution of the process, to indicate "true". The barrier processing unit 57 acquires the process information of the process for speculative processing; determines based on the process flag included in the process information, whether the speculative processing is to be executed; produces a process result after the processing comes to an end; and transmits the process result to the base station. The operation of the barrier processing unit 57 will be described later as an operation executed when the barrier process is executed by the terminal. The process result will be described later.

The execution of the OS and the library 56 implements a scheduler unit 59 and a thread managing unit 60. The scheduler unit 59 controls the switching of the threads when one processor executes the plural threads, switching the threads by the time slice execution. The time slice execution can cause even one processor to appear to be plural pseudo terminals operating concurrently with each other. The thread managing unit 60 manages the started-up threads. The CPU 52 executes various application programs.

The memory 54 is used as, for example, a work area of the CPU 52. In the memory 54, process information 61 and use data areas 62 and 63 concerning the partial loop processes are expanded. In the example depicted in FIG. 2, the storage area of the arrangement A is expanded as the use data area 62; and the storage area of the arrangement B is expanded as the use data area 63. An example of the memory 54 can be, for example, RAM.

The communicating unit 53 is connected to the mobile telephone network by wireless communication, and transmits and receives, for example, packets to and from the base station.

Figure 8:
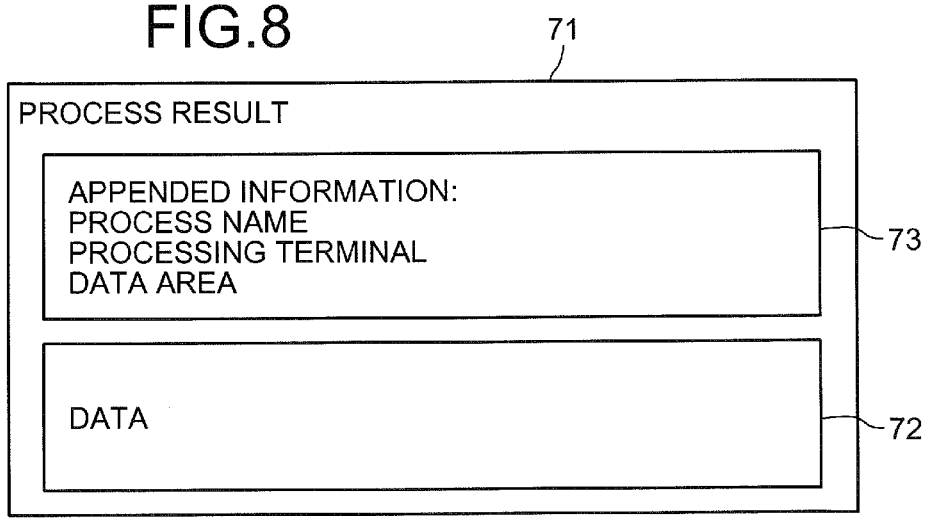
FIG. 8 is a schematic diagram of an example of a process result according to the second embodiment.

FIG. 8 is a schematic diagram of an example of the process result according to the second embodiment. As depicted in FIG. 8, the process result 71 includes data 72 and appended information 73. The data 72 stores data that is output as the result of the partial loop process. The appended information 73 has fields set for the process name, the processing terminal, and the data area.

Figure 9:
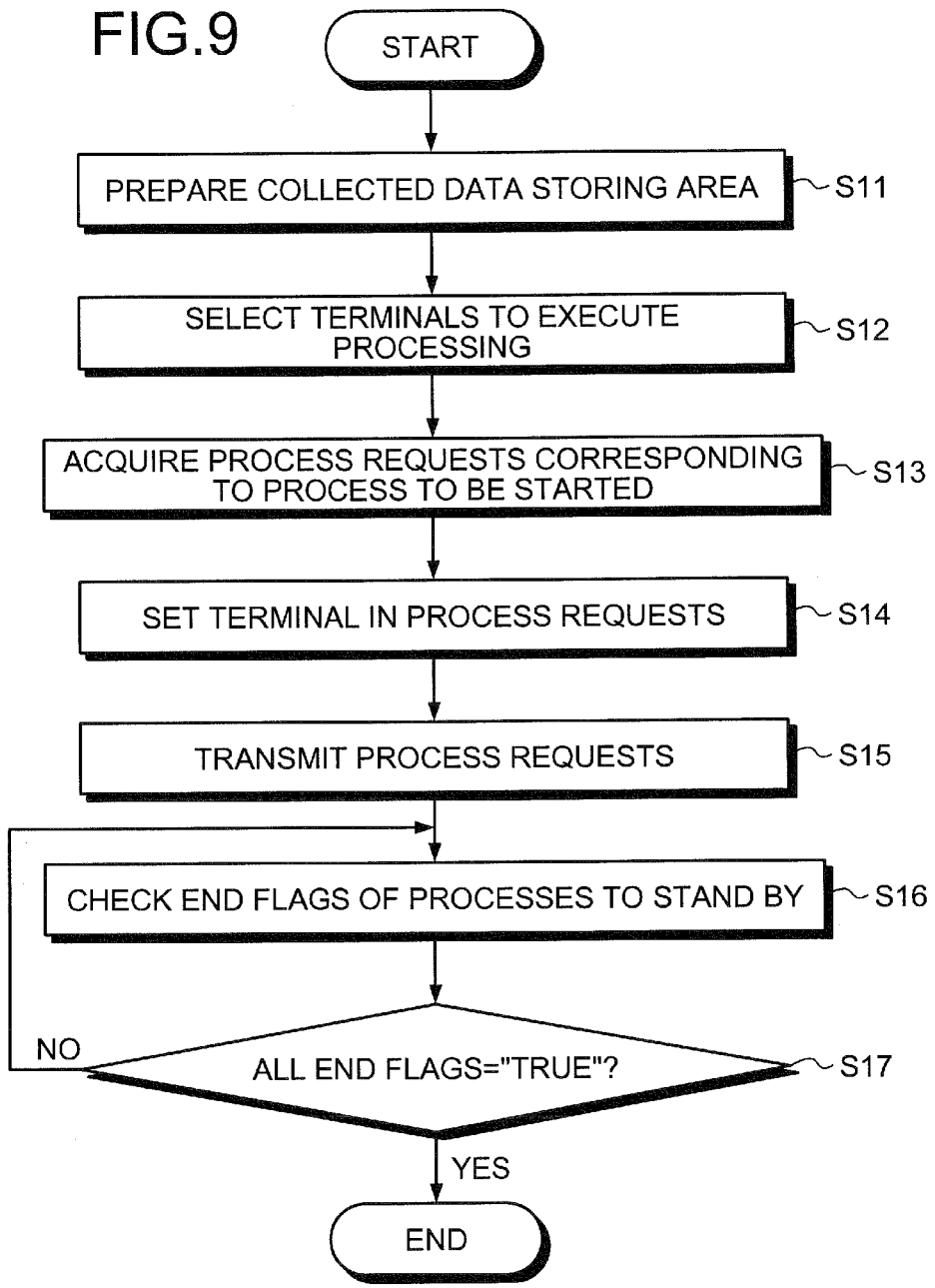
FIG. 9 is a flowchart of the operation executed when parallel processing is started by the base station, according to the second embodiment.

FIG. 9 is a flowchart of the operation executed when the parallel processing is started by the base station, according to the second embodiment. When the process request distributing unit 18 is instructed to start the parallel processing, the process request distributing unit 18 starts up operation.

As depicted in FIG. 9, the process request distributing unit 18 starts up operation; reads the parallel processing information 20 from the storage device 13; expands the parallel processing request 31 recorded in the parallel processing information 20, in the memory 14 (the expansion result is the parallel processing request 21 of FIG. 4); and prepares the collected data storing area 22 in the memory 14, based on the information concerning the collected data designated in the base station use information 32 (step S11).

The process request distributing unit 18 selects the terminals to execute the parallel processing, that is, the terminals for the processing, based on the information concerning the number of necessary terminals designated in the base station use information 32 (step S12) and acquires process requests corresponding to the process to be started, based on the information concerning the process that is starting and designated in the base station use information 32 (step S13). Either of steps S12 and S13 may be executed prior to the other.

The process request distributing unit 18 sets the terminals selected at step S12 in the process requests acquired at step S13 avoiding any redundancy of the terminals (step S14) and writes, for example, the identification information of the set terminals into the processing terminal field of the process information 33 corresponding to the parallel processing request 21 expanded in the memory 14. When the terminals are first set in the process requests, each one of the process requests may be assigned to one of the terminals.

The process request distributing unit 18 transmits the process requests to all the terminals selected at step S12 (step S15) and checks the end flags of process information 33 that corresponds to the processes designated as the processes to stand by in the base station use information 32 (step S16).

The process request distributing unit 18 stands by until all the end flags checked at step S16 indicate "true" (step S17: NO). When all the corresponding end flags indicate "true" (step S17: YES), the overall parallel processing comes to an end and the process result is stored in the collected data storing area 22 of the memory 14. The process request distributing unit 18 ends the series of process steps of the operation executed when the parallel processing is started.

Figure 10:
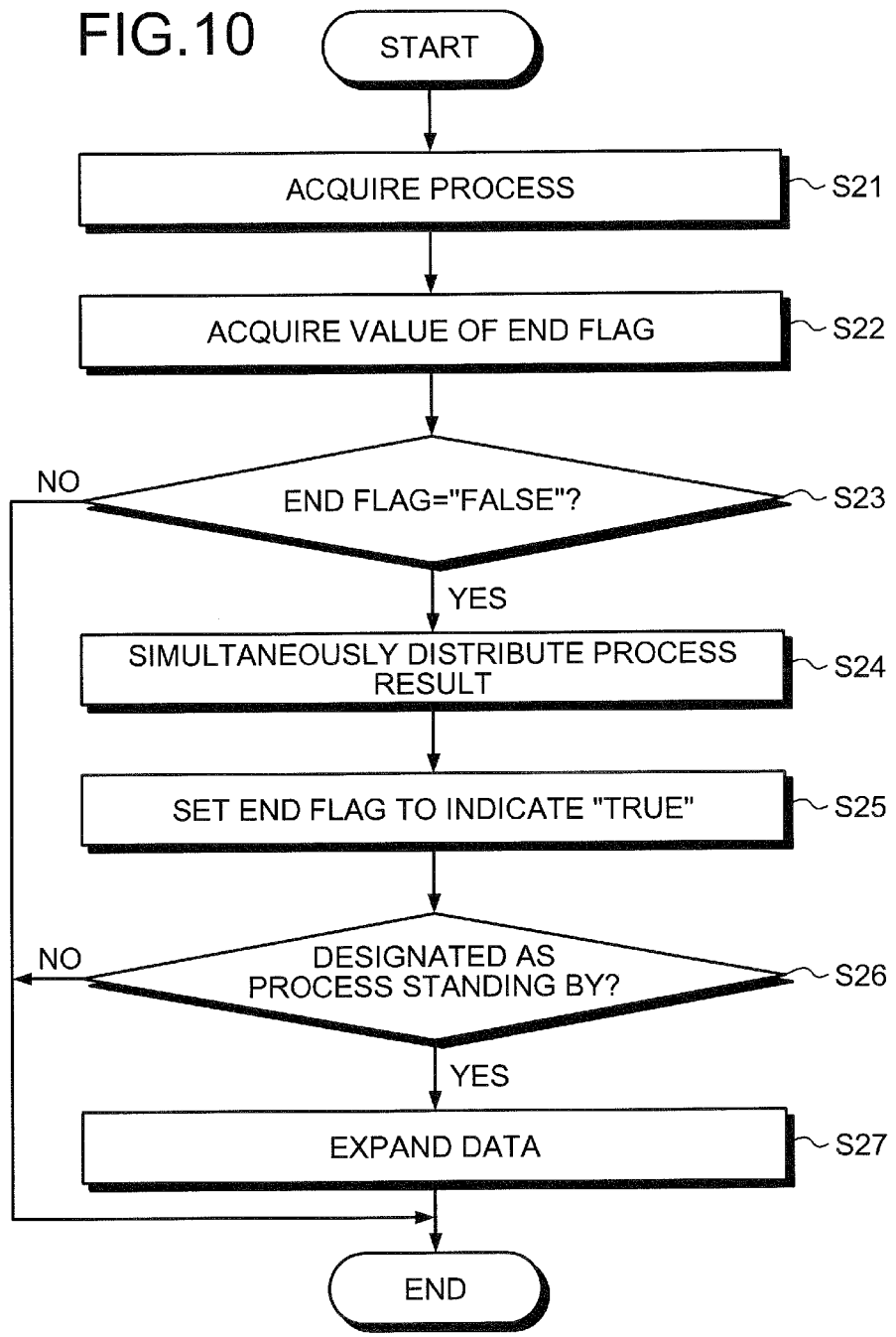
FIG. 10 is a flowchart of operation executed when a process result is received by the base station, according to the second embodiment.

FIG. 10 is a flowchart of the operation executed when the process result is received by the base station, according to the second embodiment. While the process request distributing unit 18 waits for the end flags of all the processes to stand by to indicate "true" as above (steps S16 and S17), the process result receiving unit 19 starts operation by interrupt processing when the communicating unit 15 receives the process results 71 from the terminals executing the parallel processing. In this case, if the communicating unit 15 receives the process results of the same process at substantially the same time from the plural terminals, the base station determines that any one of the process results is valid and the other process results are invalid. For example, the base station may determine that the process result received first is valid and the process results received after are invalid.

As depicted in FIG. 10, the process result receiving unit 19 starts operation; acquires the process name from the process name field of the received process result 71 (step S21); and acquires from the memory 14, the value of the end flag of the process information 33 that corresponds to the process name acquired at step S21 (step S22).

If the end flag acquired at step S22 indicates "true" (step S23: NO), the base station has already received the process result that corresponds to the process name acquired at step S21. Therefore, the process result receiving unit 19 ends the series of process steps of the operation executed when the process result is received, and returns to the process step of the operation executed when the parallel processing is started by the process request distributing unit 18.

If the process result receiving unit 19 determines that the end flag acquired at step S22 indicates "false" (step S23: YES), the process result receiving unit 19 simultaneously distributes the received process result 71 to all the terminals executing the parallel processing (step S24). Thus, each of all the terminals executing the parallel processing are informed that the partial loop processes executed by the other terminals come to an end.

The process result receiving unit 19 sets the end flag of the process information 33 corresponding to the process name acquired at step S21, to indicate "true" (step S25). Either of steps S24 and 25 may be executed prior to the other. If the process corresponding to the process name acquired at step S21 is not designated in the base station use information 32 of the parallel processing information 20 as the process standing by (step S26: NO), the process result receiving unit 19 ends the series of process steps of the operation executed when the process result is received and the process result receiving unit 19 returns to the operation executed when the parallel processing is started by the process request distributing unit 18.

If the process corresponding to the process name acquired at step S21 is designated as the process standing by (step S26: YES), the process result receiving unit 19 expands the data 72 of the process result 71 in the collected data storage area 22 prepared in the memory 14 (step S27) and ends the series of process steps of the operation executed when the process result is received and returns to the process step of the operation executed when the parallel processing is started by the process request distributing unit 18.

Figure 11:
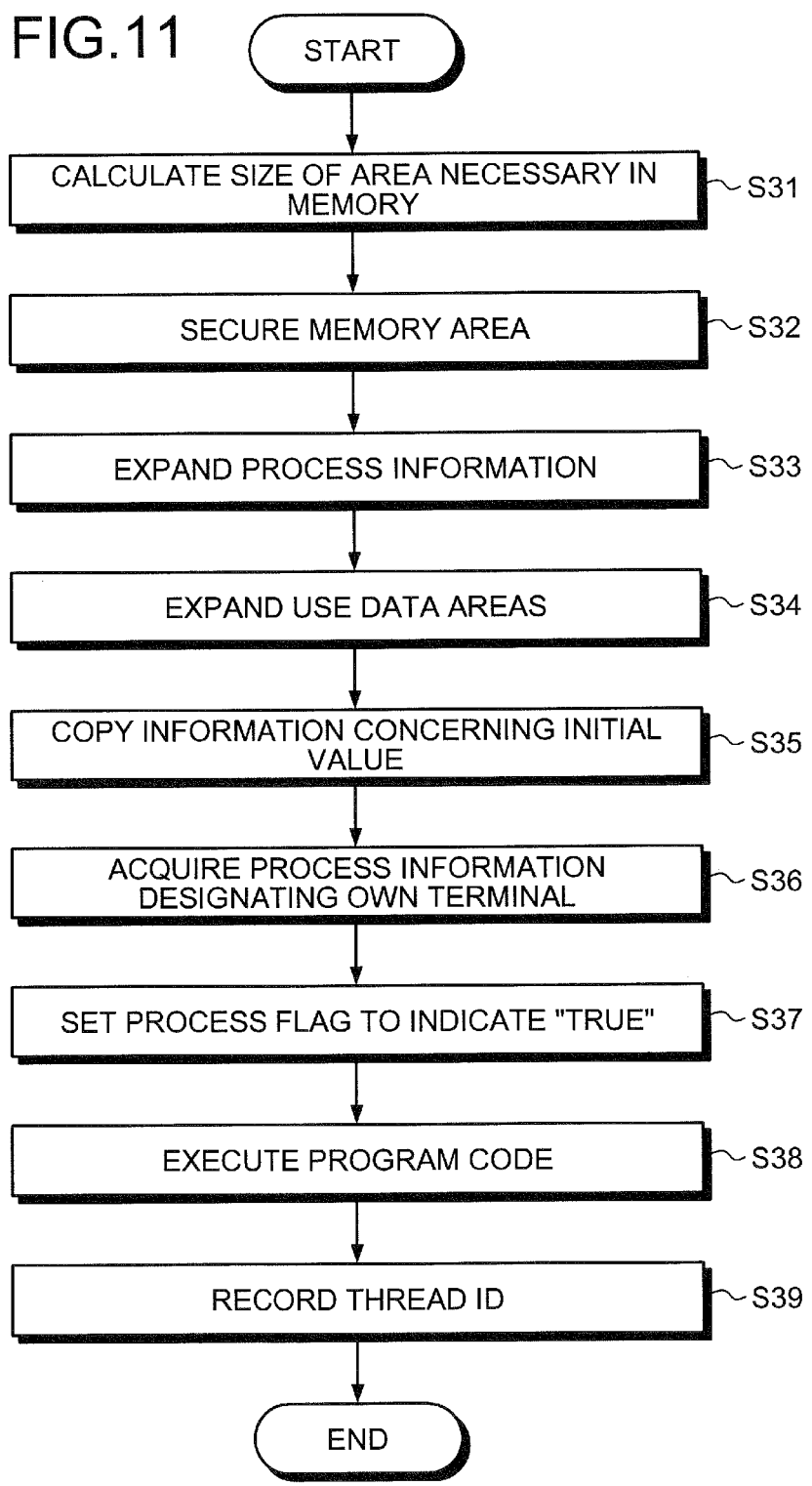
FIG. 11 is a flowchart of operation executed when a parallel processing request is received by the terminal, according to the second embodiment.

FIG. 11 is a flowchart of the operation executed when the parallel processing request is received by the terminal 51, according to the second embodiment. When the receiving unit 58 receives the parallel processing request from the base station, the receiving unit 58 starts operation.

As depicted in FIG. 11, the receiving unit 58 starts operation; calculates the size of the area necessary for expanding the process information 61 and the use data areas 62 and 63 in the memory 54 (step S31); and secures in the memory 54, a memory area of the size calculated at step S31 (step S32).

The receiving unit 58 expands in the memory 54, the process information 61 included in the received parallel process request (step S33). The receiving unit 58 expands the use data areas 62 and 63 in the memory 54 (step S34). Either of steps S33 and S34 may be executed prior to the other.

If an initial value is set in the data, the receiving unit 58 copies the information concerning the initial value of the data into the use data areas 62 and 63 expanded in the memory 54 (step S35) and acquires from the process information 61 expanded in the memory 54, process information 61 having the terminal 51 designated therein as the processing terminal (step S36). If the identification information of the terminal 51 is set in the processing terminal field in the process information 61 expanded in the memory 54, the terminal 51 is designated as the processing terminal.

The receiving unit 58 sets the process flag of the process information 61 acquired at step S36, to indicate "true" (step S37); starts up a new thread; and causes the new thread to execute the program code of the acquired process information 61 (step S38). The receiving unit 58 records into the processing thread field of the process information 61 acquired at step S36, the ID (identification information) of the thread started up at step S38 (step S39). Any execution order of the processes at steps S37 to S39 is employable. The receiving unit 58 ends the series of process steps of the operation executed when the parallel processing request is received.

Figure 12:
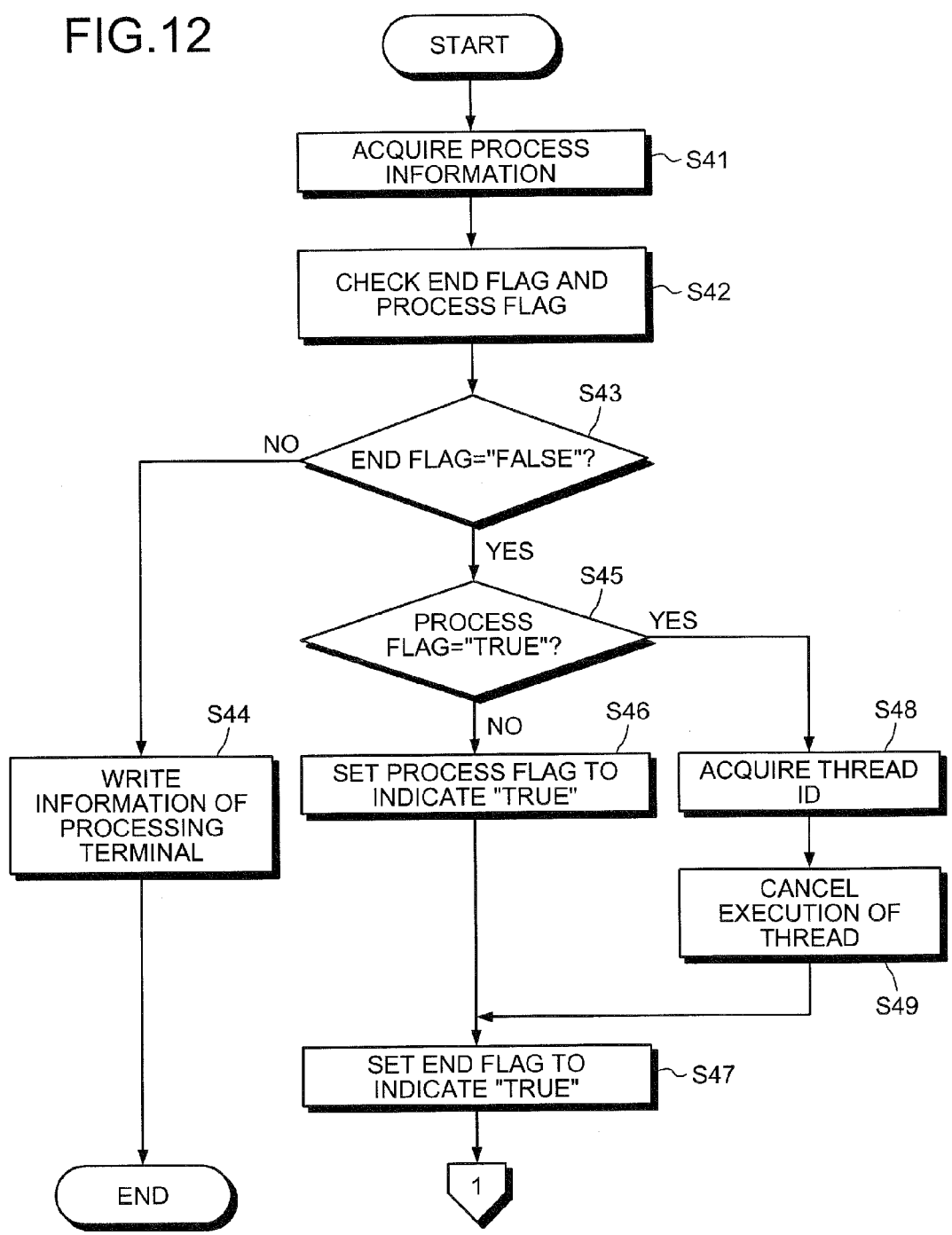
FIG. 12 is a flowchart of operation executed when the process result is received by the terminal, according to the second embodiment.
Figure 13:
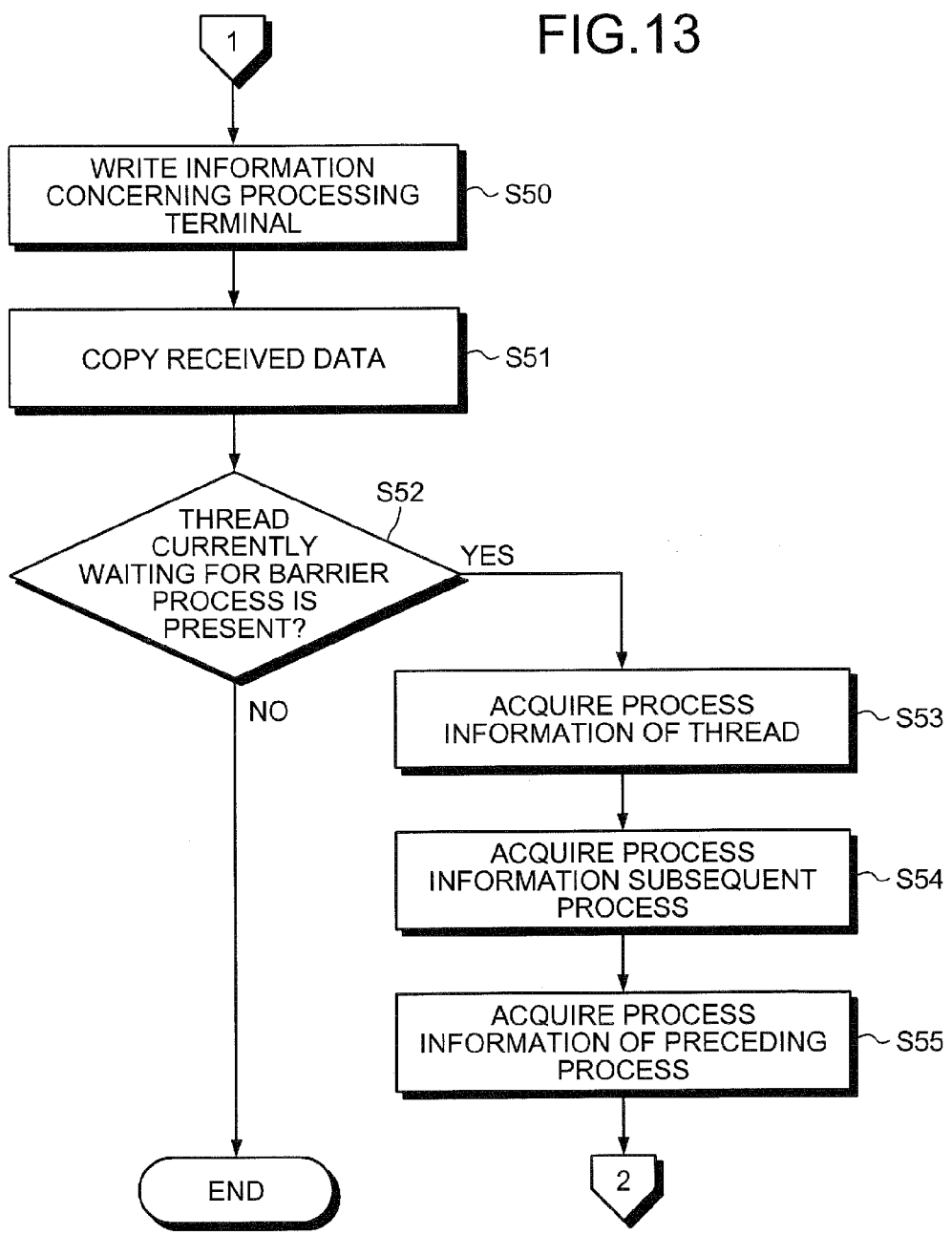
FIG. 13 is a flowchart continued from that of FIG. 12.
Figure 14:
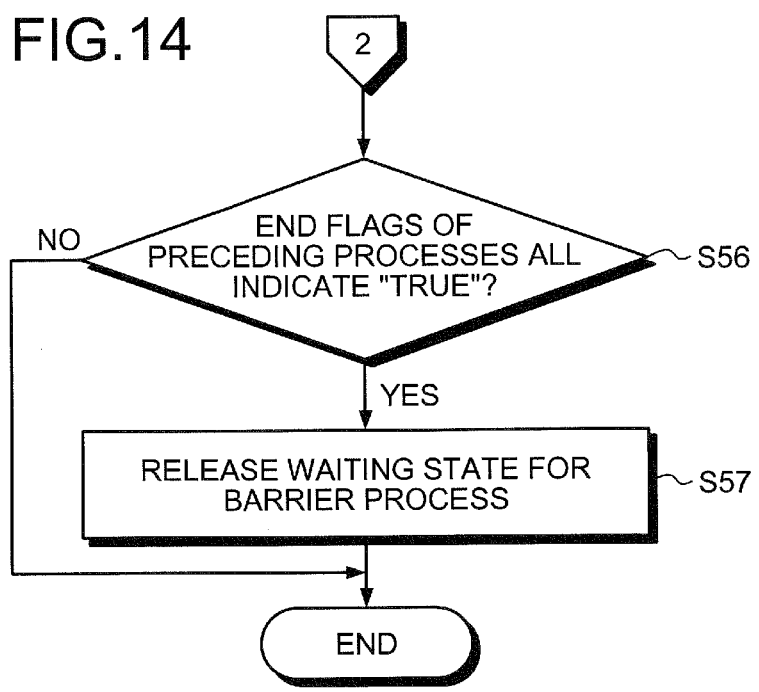
FIG. 14 is a flowchart continued from that of FIG. 13.

FIG. 12 is a flowchart of the operation executed when the process result is received by the terminal, according to the second embodiment. FIG. 13 is a flowchart continued from that of FIG. 12. FIG. 14 is a flowchart continued from that of FIG. 13. The receiving unit 58 receives from the base station, a process result obtained by another terminal and starts operation.

As depicted in FIG. 12, the receiving unit 58 starts operation; acquires the process name from the process name field of the received process result 71; acquires the process information 61 corresponding to the acquired process name (step S41); and checks the value of the end flag and that of the process flag of the process information 61 acquired at step S41 (step S42).

If the receiving unit 58 determines that the end flag indicates "true" (step S43: NO), the process corresponding to the process name acquired at step S41 is executed by the terminal 51 and has already come to an end. However, if the base station receives the process results for the same process from plural terminals as above, any one of the process results is valid. Therefore, the process result 71 distributed from the base station is more valid than the fact that the terminal 51 completes the process.

The receiving unit 58 writes information of the processing terminal set in the received process result 71 into the processing terminal field of the process information 61 acquired at step S41 (step S44) and ends the series of process steps of the operation executed when the process result is received.

On the other hand, if the receiving unit 58 determines that the end flag checked at step S42 indicates "false" (step S43: YES), the process corresponding to the process name acquired at step S41 is executed by the terminal 51 and has not yet come to an end. Therefore, based on the value of the process flag checked at step S42, it is checked whether the terminal 51 speculatively executes the process corresponding to the process name acquired at step S41.

If the process flag checked at step S42 indicates "false" (step S45: NO), the process corresponding to the process name acquired at step S41 has not been speculatively executed by the terminal 51. The receiving unit 58 sets the process flag and the end flag of the process information 61 acquired at step S41 to indicate "true" (steps S46 and S47). Either of steps S46 and S47 may be executed prior to the other.

On the other hand, if the process flag checked at step S42 indicates "true" (step S45: YES), the process corresponding to the process name acquired at step S41 has been speculatively executed by the terminal 51. The receiving unit 58 acquires the ID of the thread from the processing thread field of the process information 61 acquired at step S41 (step S48), cancels the speculative execution of the thread corresponding to the acquired ID (step S49), and sets the end flag of the process information 61 acquired at step S41 to indicate "true" (step S47). Either of steps S49 and S47 may be executed prior to the other.

As depicted in FIG. 13, the receiving unit 58 writes the information concerning the processing terminal set in the received process result 71 into the processing terminal field of the process information 61 acquired at step S41 (step S50) and copies the data 72 included in the received process result 71 into the use data areas 62 and 63 of the memory 54 (step S51). For example, in the example depicted in FIG. 2, the data 72 is copied into the use data area 62, if the data 72 is the data of the arrangement A; or into the use data area 63, if the data 72 is the data of the arrangement B. Either of steps S50 and S51 may be executed prior to the other.

The receiving unit 58 checks whether any thread currently waiting for the barrier process is present. If the receiving unit 58 determines that no thread currently waiting for the barrier process is present (step S52: NO), the receiving unit 58 ends the series of process steps of the operation executed when the process result is received.

On the other hand, if the receiving unit 58 determines that a thread currently waiting for the barrier process is present (step S52: YES), the receiving unit 58 acquires from the memory 54, the process information 61 corresponding to the ID (identification information) of the thread currently waiting for the barrier process (step S53) and acquires from the memory 54, the process information 61 of the subsequent process of the process indicated by the process information 61 acquired at step S53 (step S54). For example, in the example depicted in FIG. 2, if the thread currently executing the process 1-1 is waiting for the barrier process, the receiving unit 58 acquires from the memory 54, the process information 61 of the process 2-1 that is the subsequent process of the process 1-1.

The receiving unit 58 acquires from the memory 54, the process information 61 of the preceding process of the process information 61 acquired at step S54 (step S55). For example, in the example depicted in FIG. 2, if the receiving unit 58 acquires the process information 61 of the process 2-1 at step S54, the receiving unit 58 acquires from the memory 54, the process information 61 of the processes 1-1 to 1-10 that are the preceding processes of the process 2-1.

As depicted in FIG. 14, the receiving unit 58 checks the values of the end flags of the process information 61 for each of the preceding processes acquired at step S55. If the receiving unit 58 determines that the end flags of the preceding processes all indicate "true" (step S56: YES), the receiving unit 58 releases the waiting state of the threads currently waiting for the barrier process (step S57) and ends the series of process steps of the operation executed when the process result is received. On the other hand, if the receiving unit 58 determines that at least one of the end flags of all the preceding processes does not indicate "true" (step S56: NO), the receiving unit 58 executes no operation and ends the series of process steps of the operation executed when the process result is received.

For example, in the example depicted in FIG. 2, in a case where the process 1-1 is currently waiting for the barrier process, when all the processes 1-1 to 1-10 come to an end that precede the process 2-1 that is the subsequent process of the process 1-1, the state of the process 1-1 to wait for the barrier process can be released. At step S54, the receiving unit 58 checks the subsequent process 2-1 of the process currently waiting for the barrier process. At steps S55 and S56, the receiving unit 58 checks whether all the processes 1-1 to 1-10 that precede the subsequent process 2-1 have come to an end. If the receiving unit 58 determines that the processes 1-1 to 1-10 have come to an end, the receiving unit 58 can release the waiting state of the process 1-1 waiting for the barrier process and can start the subsequent process 2-1.

When the terminal advances the processing of the thread, the barrier process is invoked. For example, in the example depicted in FIG. 2, it is assumed that a terminal to which the processes 1-1, 2-1, and 3-1 are assigned completes the process 2-1 and the barrier process is invoked. For the barrier process in this case, three cases as below can be considered to be likely to occur.

Firstly, a case is present where the process 1-2 completely comes to an end after being speculatively executed by a corresponding terminal after the process 1-1 has ended and therefore, after the process 2-1 comes to an end, the corresponding terminal preferentially executes the process 2-2, which is the subsequent process of the process 1-2 (a first case). Secondly, a case is present where some of the processes 2-2 to 2-10 have not yet ended and therefore, the corresponding terminal speculatively executes the processes that have not yet ended among the processes 2-2 to 2-10 and waits for the barrier process (a second case). Thirdly, a case is present where all the processes 2-2 to 2-10 already come to an end at the time point at which the barrier process is invoked and the corresponding terminal can execute the next process 3-1 (a third case). Each of the three cases will be described.

Figure 15:
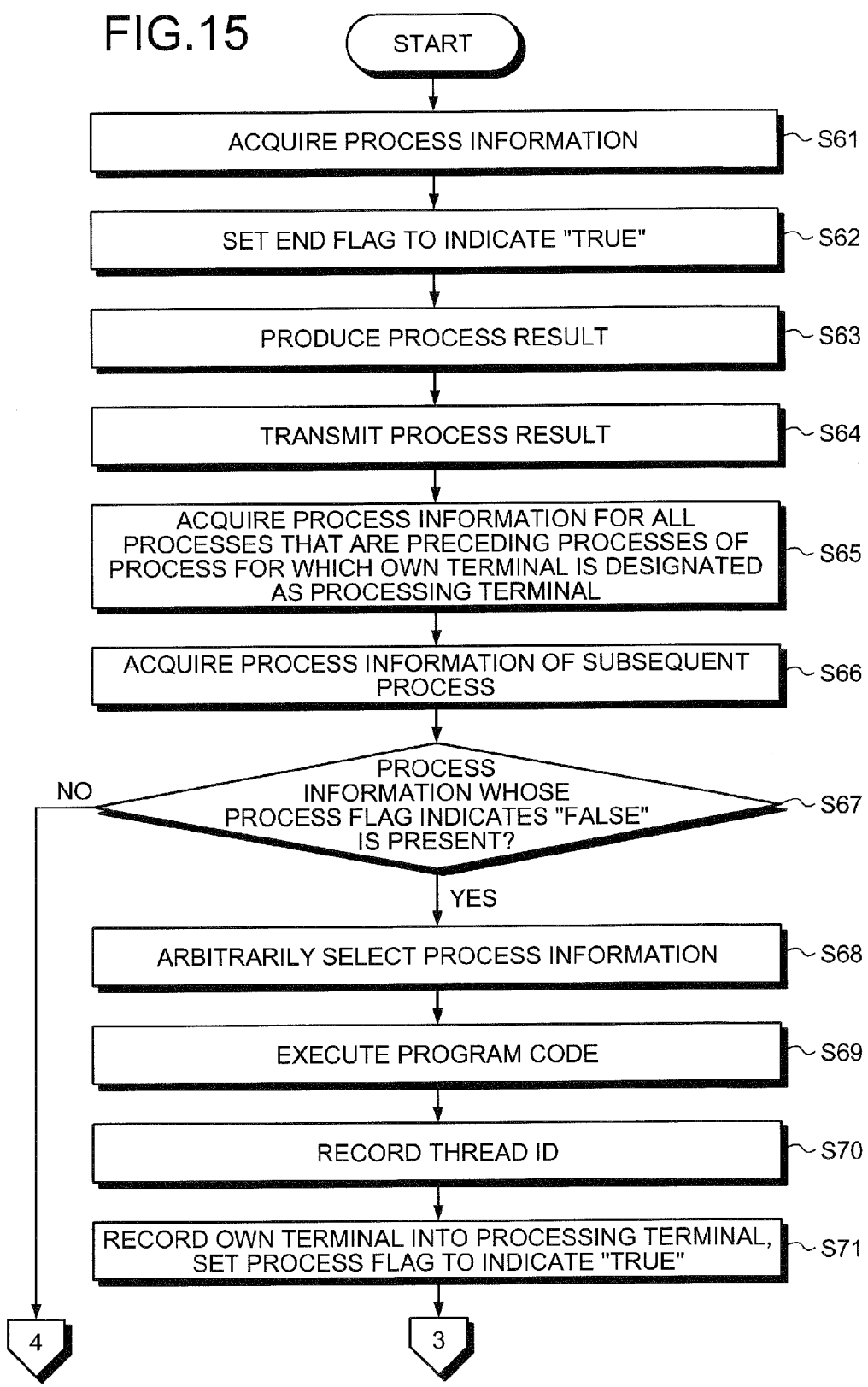
FIG. 15 is a flowchart of operation executed when a barrier process is executed by the terminal, according to the second embodiment.
Figure 16:
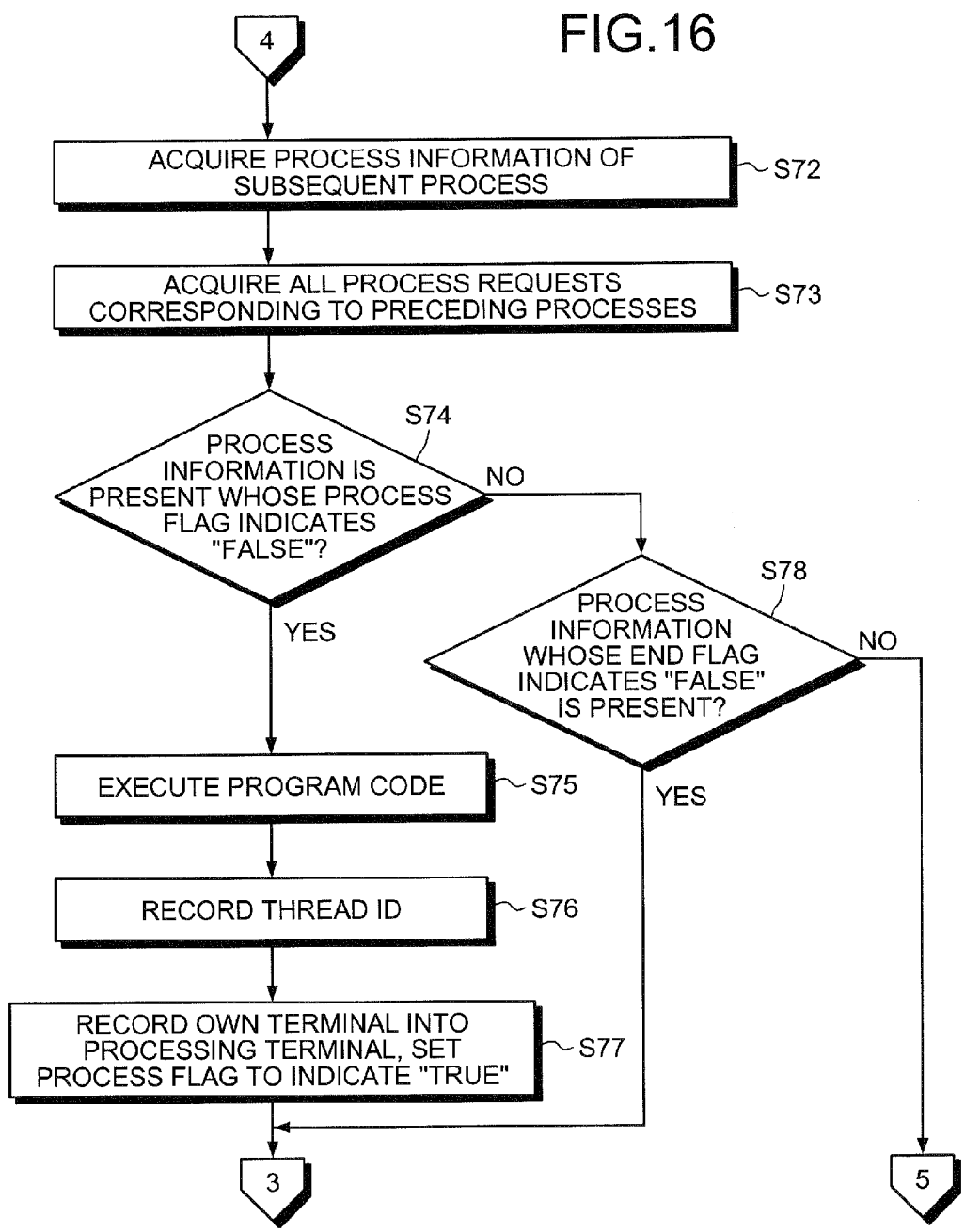
FIG. 16 is a flowchart continued from that of FIG. 15.
Figure 17:
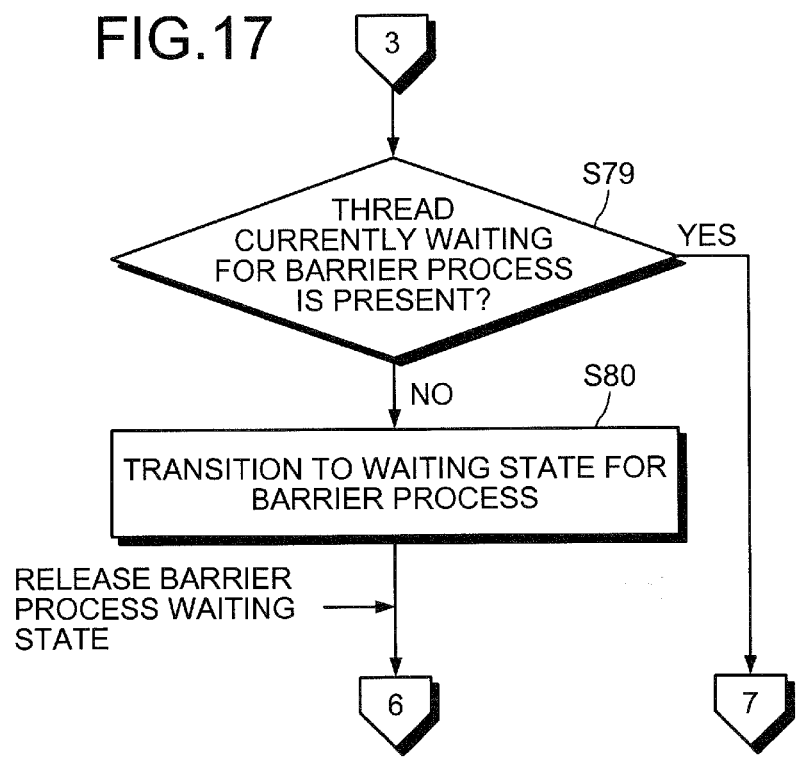
FIG. 17 is a flowchart continued from those of FIGS. 15 and 16.
Figure 18:
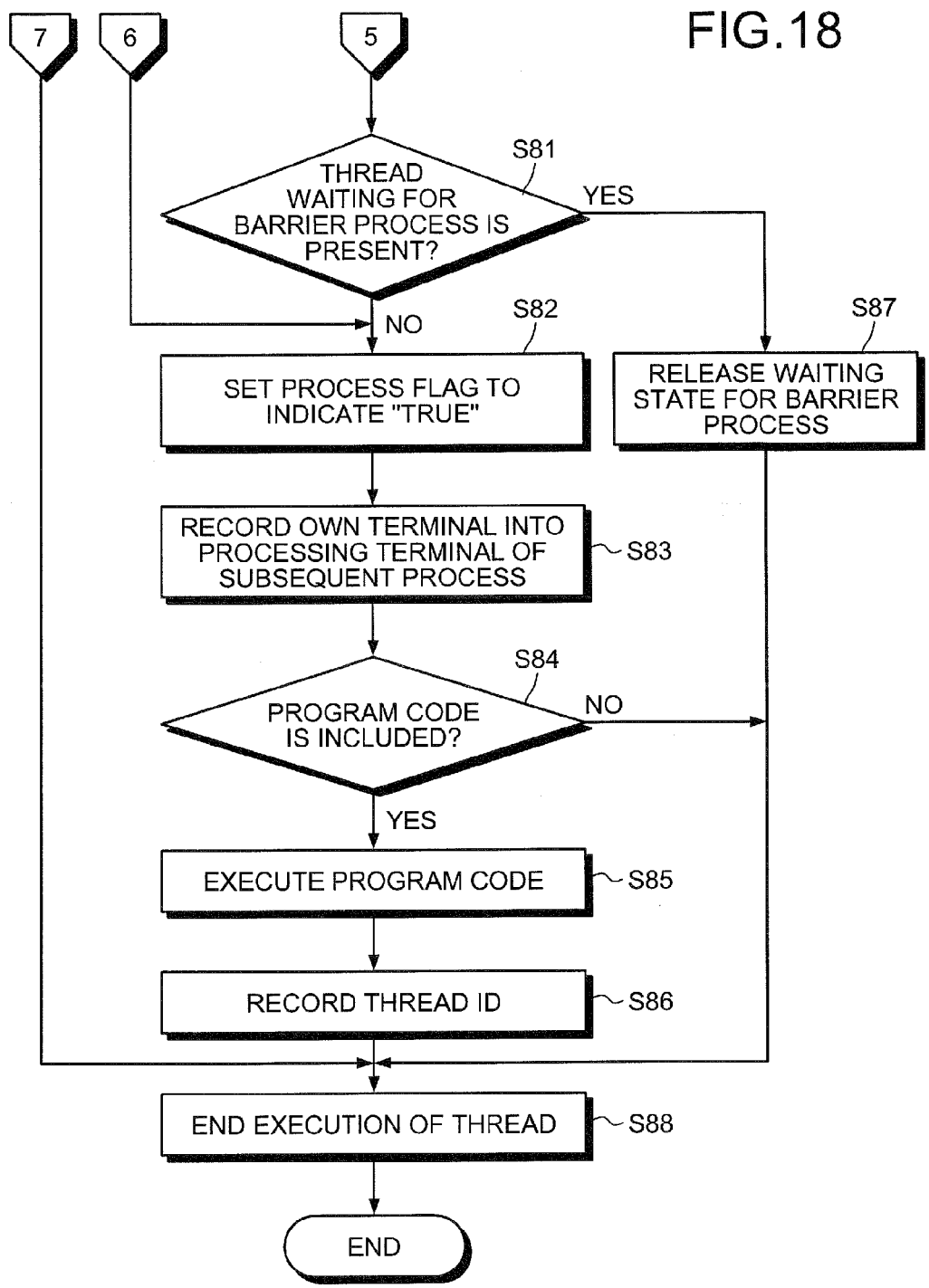
FIG. 18 is a flowchart continued from those of FIGS. 16 and 17.

FIG. 15 is a flowchart of the operation executed when the barrier process is executed by the terminal 51, according to the second embodiment. FIG. 16 is a flowchart continued from that of FIG. 15. FIG. 17 is a flowchart continued from those of FIGS. 15 and 16. FIG. 18 is a flowchart continued from those of FIGS. 16 and 17. When the barrier process is invoked, the barrier processing unit 57 starts operation.

First Case

As depicted in FIG. 15, the barrier processing unit 57 starts operation; acquires from the memory 54, the process information 61 corresponding to the ID (identification information) of the thread that invokes the barrier process (step S61); and sets the end flag of the process information 61 acquired at step S61 to indicate "true" (step S62).

The barrier processing unit 57 produces the process result 71 as depicted in FIG. 8, based on the information in the data output area field of the process information 61 acquired at step S61 (step S63) and transmits the produced process information 71 to the base station (step S64). Step S62 may be executed after step S63 or after step S64.

The barrier processing unit 57 acquires from the process information 61 expanded in the memory 54, the process information 61 for all the processes that are the preceding processes of the process for which the terminal 51 is designated as a processing terminal and that is executed by the thread invoking the process for barrier synchronization (step S65) and acquires from the memory 54, the process information 61 of the subsequent process of all the process information 61 acquired at step S65 (step S66).

For example, in the example depicted in FIG. 2, when the process 2-1 is the process executed by the thread that invokes the process for barrier synchronization, the barrier processing unit 57 acquires the process information 61 having the terminal 51 designated therein as the processing terminal, among the processes 1-1 to 1-10 that are the preceding processes of the process 2-1. For example, if the terminal 51 is designated as the processing terminal in the process information 61 concerning the processes 1-1, 1-2, and 1-3, the terminal 51 has already completely executed the processes 1-1, 1-2, and 1-3 before the current time point.

If the process 1-1 is a process to originally be executed by the terminal 51, the processes 1-2 and 1-3 are the processes that have been speculatively executed by the terminal 51 in the past and can be completely be executed thereby. The terminal 51 executes not only the process 2-1 that is the subsequent process of the process 1-1 but also the processes 2-2 and 2-3 that respectively are the subsequent processes of the processes 1-2 and 1-3. Therefore, the barrier processing unit 57 acquires the process information 61 concerning the processes 2-1, 2-2, and 2-3 that respectively are the subsequent processes of the processes 1-1, 1-2, and 1-3.

The barrier processing unit 57 checks whether any process information 61 whose process flag indicates "false" is present among the process information 61 acquired at step S66. If the barrier processing unit 57 determines that process information 61 whose process flag indicates "false" is present (step S67: YES), the barrier processing unit 57 starts up a new thread and causes the new thread to execute the program code of the process information 61 whose process flag indicates "false" (step S69). In this case, if the barrier processing unit 57 determines that plural process flags that indicate "false" are present, the barrier processing unit 57 arbitrarily selects process information 61 whose process flag indicates "false" (step S68) and causes the new thread to execute the program code thereof (step S69).

The barrier processing unit 57 records the ID (identification information) of the thread started up at step S69 into the processing thread field of the process information 61 whose program code is executed at step S69 (step S70), records the information concerning the terminal 51 into the processing terminal field of the process information 61 whose program code is executed at step S69, and sets the process flag of the corresponding process information 61 to indicate "true" (step S71). Any execution order of the processes at steps S69 to S71 is employable.

As depicted in FIG. 17, the barrier processing unit 57 checks whether any thread currently waiting for the barrier process is present. If the barrier processing unit 57 determines that no thread currently waiting for the barrier process is present (step S79: NO), the barrier processing unit 57 causes the state of the thread started up at step S69 to transition to the waiting state for the barrier process (step S80). In this state, when the receiving unit 58 of the terminal releases the waiting state for the barrier process of the thread currently waiting for the barrier process (step S57 of FIG. 14), the barrier processing unit 57 advances to step S82 of the flowchart depicted in FIG. 18.

As depicted in FIG. 18, the barrier processing unit 57 sets the process flag to indicate "true" in the process information 61 of the subsequent process of the process executed by the thread whose waiting state for the barrier process has been released (step S82) and records the information of the terminal 51 into the processing terminal field of the process information 61 of the subsequent process of the process executed by the thread whose waiting state for the barrier process has been released (step S83). Either of steps S82 and S83 may be executed prior to the other.

The barrier processing unit 57 checks whether any program code is included in the process information 61 of the subsequent process of the process executed by the thread whose waiting state for the barrier process has been released. If the barrier processing unit 57 determines that no program code is included (step S84: NO), the barrier processing unit 57 causes the execution of the thread of the subsequent process of the process executed by the thread whose waiting state for the barrier process has been released (step S88), and ends the series of process steps of the operation executed when the barrier process is executed.

For example, in the example depicted in FIG. 2, among the process executed by the thread whose waiting state for the barrier process is released, if the subsequent processes are the processes 3-1 to 3-10, this corresponds to the case where no program code is included at step S84.

If the barrier processing unit 57 determines at step S84 that a program code is included (step S84: YES), the barrier processing unit 57 starts up a new thread, causes the new thread to execute the program code of the process information 61 of the subsequent process of the process executed by the thread whose waiting state for the barrier process has been released (step S85), and records the ID (identification information) of the thread started up at step S85 into the processing thread field of the process information 61 whose program code is executed at step S85 (step S86). The barrier processing unit 57 ends the execution of the thread of the subsequent process of the process executed by the thread whose waiting state for the barrier process that has been released (step S88), and ends the series of process steps of the operation executed when the barrier process is executed.

On the other hand, if the barrier processing unit 57 determines at step S79, that a thread currently waiting for the barrier process is already present (step S79: YES), the barrier processing unit 57 as depicted in FIG. 18 causes the execution of the thread started up at step S69 to come to an end (step S88), and ends the series of process steps of the operation executed when the barrier process is executed.

If the barrier processing unit 57 determines at step S67, that plural process flags of the process information 61 indicate "false", the process for the first case is executed plural times. For example, in the example depicted in FIG. 2, it is assumed that, when the terminal speculatively executes the processes 2-2 and 2-3 after the execution of the process 2-1 that originally is to be processed thereby comes to an end, speculative execution of, for example, the process 2-2 is executed by a first session of the first case process. When the barrier process is invoked in response to the end of the process 2-2, the corresponding terminal executes the speculative execution of, for example, the process 2-3 by a second session of the first case process. The plural processes can speculatively be executed by repeating the above.

Second Case

If no process corresponding to the first case is present or if the barrier process is invoked by the final process that corresponds to the first case, this corresponds to a case where no process information 61 is present whose process flag indicates "false" at step S67 of the flowchart depicted in FIG. 15 (step S67: NO). Therefore, as depicted in FIG. 16, the barrier processing unit 57 acquires from the memory 54, the process information 61 corresponding to the subsequent process of the process information 61 acquired at step S61 (step S72).

The barrier processing unit 57 acquires from the memory 54, all the process requests corresponding to the preceding processes of the process information 61 acquired at step S72 (step S73) and checks whether process information 61 is present whose process flag indicates "false" for the process requests acquired at step S73. If the barrier processing unit 57 determines that process information 61 is present whose process flag indicates "false" (step S74: YES), a process capable of being speculatively executed is present. Therefore, the barrier processing unit 57 starts up a new thread for each process flag that indicates "false" and causes the new thread to execute the program code of the corresponding process information 61 (step S75).

The barrier processing unit 57 records into the processing thread field of the process information 61 whose program code is executed at step S75, the ID (identification information) of the thread started up at step S75 (step S76), records into the processing terminal field of the process information 61 whose program code is executed at step S69, the information concerning the terminal 51, and sets the process flag of the corresponding the process information 61 to indicate "true" (step S77). Any execution order of the processes at steps S75 to S77 is employable. The barrier processing unit 57 progresses to step S79 of the flowchart depicted in FIG. 17.

As depicted in FIG. 17, the barrier processing unit 57 checks whether a thread currently waiting for the barrier process is present. If the barrier processing unit 57 determines that no thread currently waiting for the barrier process is present (step S79: NO), the barrier processing unit 57 causes the state of the thread started up at step S75 to transition to the waiting state for the barrier process (step S80). In this state, when the receiving unit 58 of the terminal releases the waiting state for the barrier process of the thread currently waiting for the barrier process (step S57 of FIG. 14), the barrier processing unit 57 progresses to step S82 of the flowchart depicted in FIG. 18. At steps S82 and thereafter or at step S79, if the barrier processing unit 57 determines that a thread currently waiting for the barrier process is already present (step S79: YES), the same as in the first case is applied to both of the above.

On the other hand, if the barrier processing unit 57 determines at step S74 that no process information 61 is present whose process flag indicates "false" (step S74: NO), no process capable of being speculatively executed is present. Therefore, the barrier processing unit 57 checks whether process information 61 whose end flag indicates "false" is present for the process requests acquired at step S73. If the barrier processing unit 57 determines that process information 61 whose end flag indicates "false" is present (step S78: YES), a process currently executed speculatively is present. In this case, the process step progresses to step S79 of the flowchart depicted in FIG. 17.

As depicted in FIG. 17, if the barrier processing unit 57 determines that no thread currently waiting for the barrier process is present (step S79: NO), the barrier processing unit 57 causes the state of the thread executing the process of the process information 61 whose end flag indicates "false", that is, the process currently executed speculatively, to transition to the waiting state for the barrier process (step S80). At steps thereafter or step S79, if a thread waiting for the barrier process is already present (step S79: YES), the same as in the first case is applied to both of the above.

Third Case

If the barrier process is invoked without the presence of any process capable of being speculatively executed or any process currently executed speculatively, this corresponds to a state where no process information 61 is present whose end flag indicates "false" at step S78 of the flowchart depicted in FIG. 16 (step S78: NO). In this state, as depicted in FIG. 18, if a thread waiting for the barrier process is present (step S81: YES), the barrier processing unit 57 releases the state of the thread to wait for the barrier process (step S87), ends the execution of the thread whose waiting state for the barrier process is released (step S88), and ends the series of process steps of the operation executed when the barrier process is executed.

On the other hand, if no thread waiting for the barrier process is present (step S81: NO), the current thread is the process executed first in this stage for the terminal and the processes executed by the other terminals have already ended, and therefore, the terminal does not need to wait for the barrier process. Therefore, similarly to the case where the receiving unit 58 releases the waiting state for the barrier process, the barrier processing unit 57 executes the processes at steps S82 and thereafter.

According to the second embodiment, the same effect is achieved as that of the first embodiment. Each terminal speculatively executes a process that has not ended, as an independent thread by the time slice execution. Therefore, the inconvenience of the process that is proper to be speculatively executed being unknown is prevented.

A third embodiment is an example where, in the second embodiment, a priority level is set in the thread that is speculatively executed by the terminal and a longer CPU period is assigned to a thread whose priority level is higher during the time slice execution.

Figure 19:
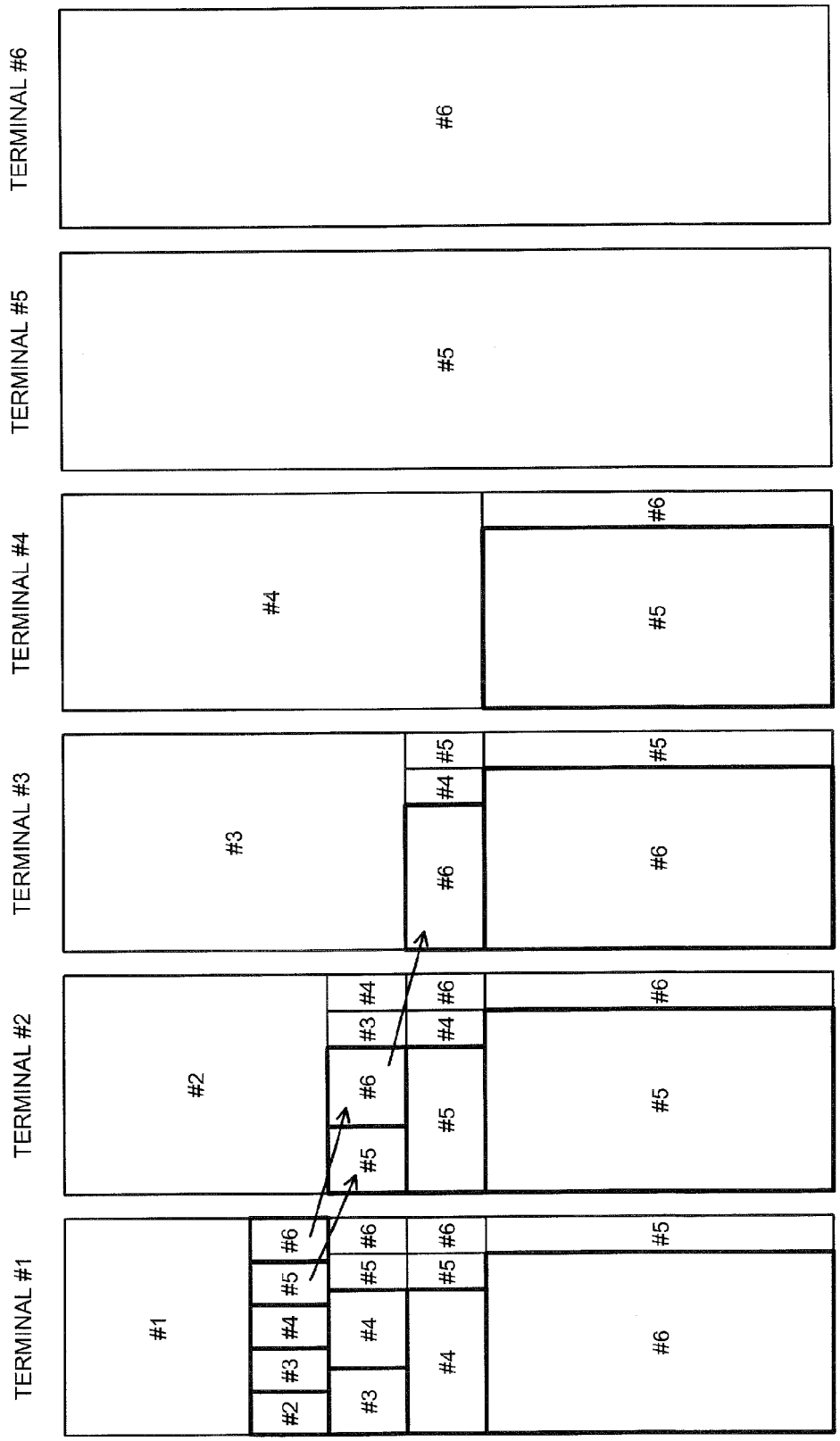
FIG. 19 is an explanatory schematic diagram of parallel processing executed when a priority level is set for a process to be speculatively executed.

FIG. 19 is an explanatory schematic diagram of the parallel processing executed when the priority level is set in a process to be speculatively executed. In an example depicted in FIG. 19, two types of priority levels are set that are "high" and "low", and threads having high priority levels are each surrounded by a thick line. FIG. 19 depicts the example for six terminals.

As depicted in FIG. 19, after completing the execution of a thread #1 that executes the process assigned to the terminal #1, the terminal #1 currently executes speculatively at high priority levels threads #2 to #6. At this time point, the terminal #1 is the terminal having the greatest number of threads currently under speculative thereby with high priority. When execution of the thread #2 executing the process assigned to a terminal #2 comes to an end, the terminal #2 speculatively executes at high priority, a number of threads (#5 and #6) that corresponds to a half or a substantially half of the number of threads currently executed speculatively at high degrees by the terminal #1. For the terminal #1, the priority levels of the threads (#5 and #6) whose priority levels are each set to be "high" by the terminal #2 are each changed to "low".

At this time point, it is assumed, for example, that the terminal #2 is the terminal having the greatest number of threads currently under speculative execution with high priority. When the execution of the thread #3 executing the process assigned to a terminal #3 comes to an end, the terminal #3 speculatively executes at high priority, a number of threads (#6) that corresponds to a half or substantially half of the number of threads currently under speculative execution at high levels by the terminal #2. For the terminal #2, the priority level of the thread (#6) whose priority level is set to be "high" by the terminal #3 is changed to "low". The same is applied to each of the other terminals. By executing as above, the number of threads speculatively executed at the high priority is equalized among the terminals executing the parallel processing.

When the threads to be speculatively executed decrease, the number of speculatively executing terminals exceeds the number of threads to be speculatively executed. In this case, plural terminals speculatively execute the same thread at the high priority. Therefore, the thread executed at the high priority by the fewest number of terminals is executed at the high priority. By executing as above, the number of threads executed at the high priority is equalized among the threads to be speculatively executed. For example, in the example depicted in FIG. 19, the priority level of each of the threads #5 and #6 is set to be high for, for example, the terminals #1 to #4 and the threads #5 and #6 are evenly executed.

Figure 20:
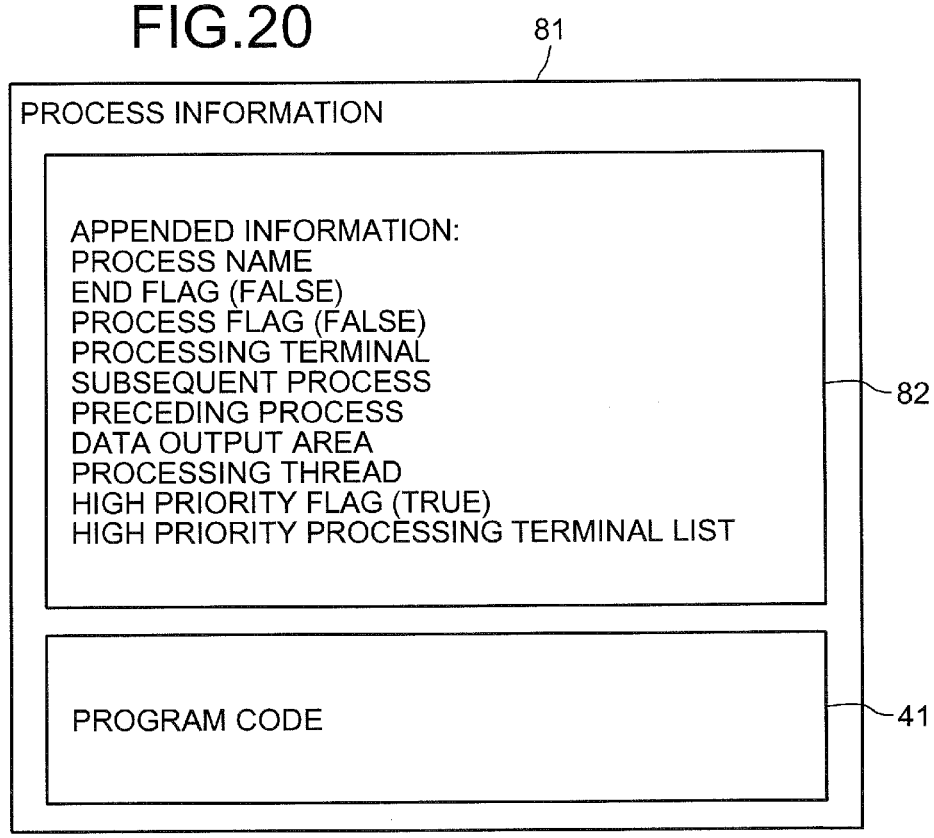
FIG. 20 is a schematic diagram of an example of the process information according to a third embodiment.

FIG. 20 is a schematic diagram of an example of process information according to the third embodiment. As depicted in FIG. 20, appended information 82 of process information 81 has fields set therein for the high priority flag and high priority processing terminal list, in addition to the appended information 42 of the process information 33 according to the second embodiment (see FIG. 6). For example, when the high priority flag indicates "true", the thread executing the process corresponding to the process information 81 is set to have high priority. The high priority flag field may have, for example, "true" set therein as an initial value. When the initial value of the high priority flag is "true", each thread is started up to operate at the high priority. The high priority processing terminal list field records the terminal that executes at the high priority, the thread executing the process that corresponds to the process information 81.

Figure 21:
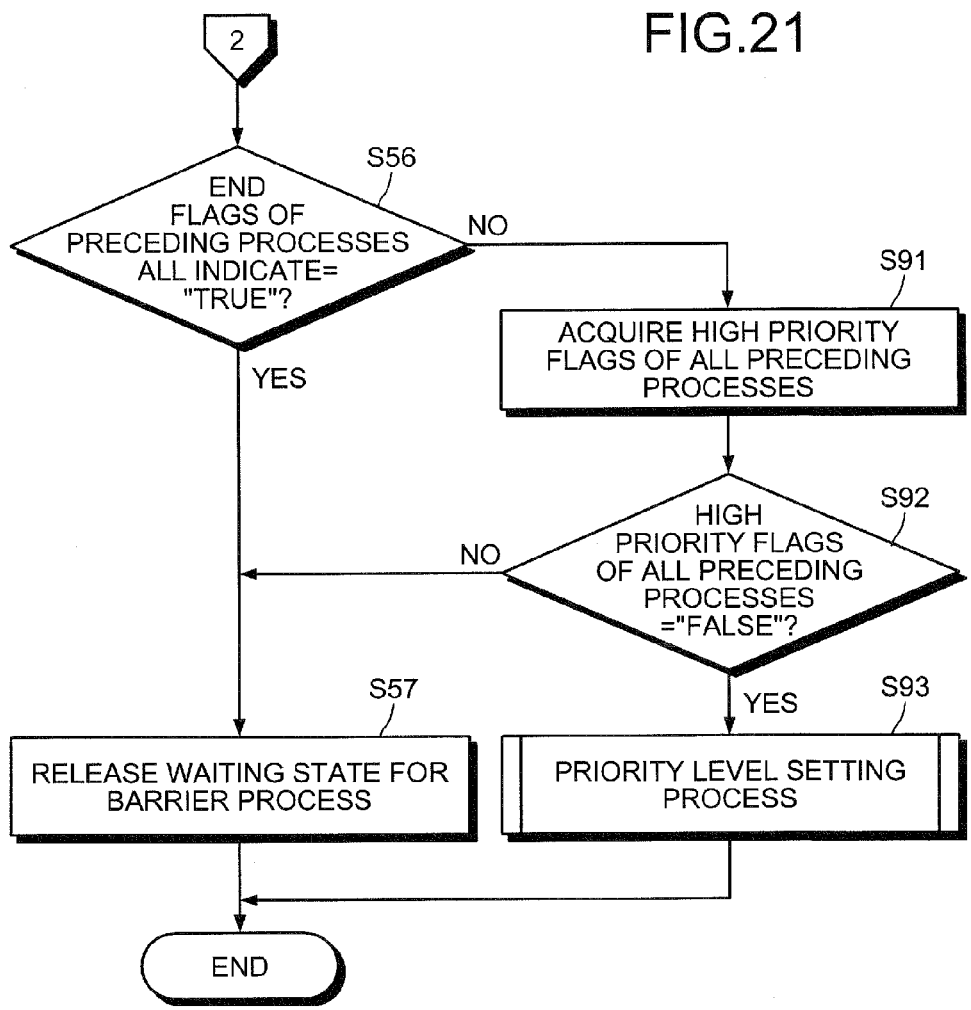
FIG. 21 is a flowchart continued from that of FIG. 13 of the operation executed when the process result is received by the terminal, according to the third embodiment.

FIG. 21 is a flowchart continued from that of FIG. 13 of the operation executed when the process result is received by the terminal, according to the third embodiment. In the third embodiment, for the operation executed when the process result is received described with reference to FIGS. 12 to 14 in the second embodiment, the receiving unit 58 executes an operation whose portion corresponding to the flowchart depicted in FIG. 14 is replaced by the flowchart depicted in FIG. 21. Only the points that differ from the second embodiment will be described. Therefore, the flowcharts depicted in FIGS. 12 and 13 will not again be described.

Steps S41 to S57 are same as those described in the second embodiment. As depicted in FIG. 21, if the receiving unit 58 determines that at least one of the end flags does not indicate "true" for all the preceding processes acquired at step S55 of FIG. 13 (step S56: NO), the receiving unit 58 acquires high priority flags of all the preceding processes acquired at step S55 (step S91) and checks the values of the high priority flags of all the preceding processes acquired at step S91.

If the receiving unit 58 determines that at least one end flag does not indicate "false" (step S92: NO), the receiving unit 58 releases the waiting state for the barrier process of the thread waiting for the barrier process (step S57) and ends the series of process steps of the operation executed when the process result is received. If the receiving unit 58 determines that the high priority flags of all the preceding processes acquired at step S91 indicate "false" (step S92: YES), the execution of each of the threads whose priority is set to be high comes to an end. Therefore, the receiving unit 58 executes a priority level setting process (step S93) and ends the series of process steps of the operation executed when the process result is received. The priority level setting process will be described later.

Figure 22:
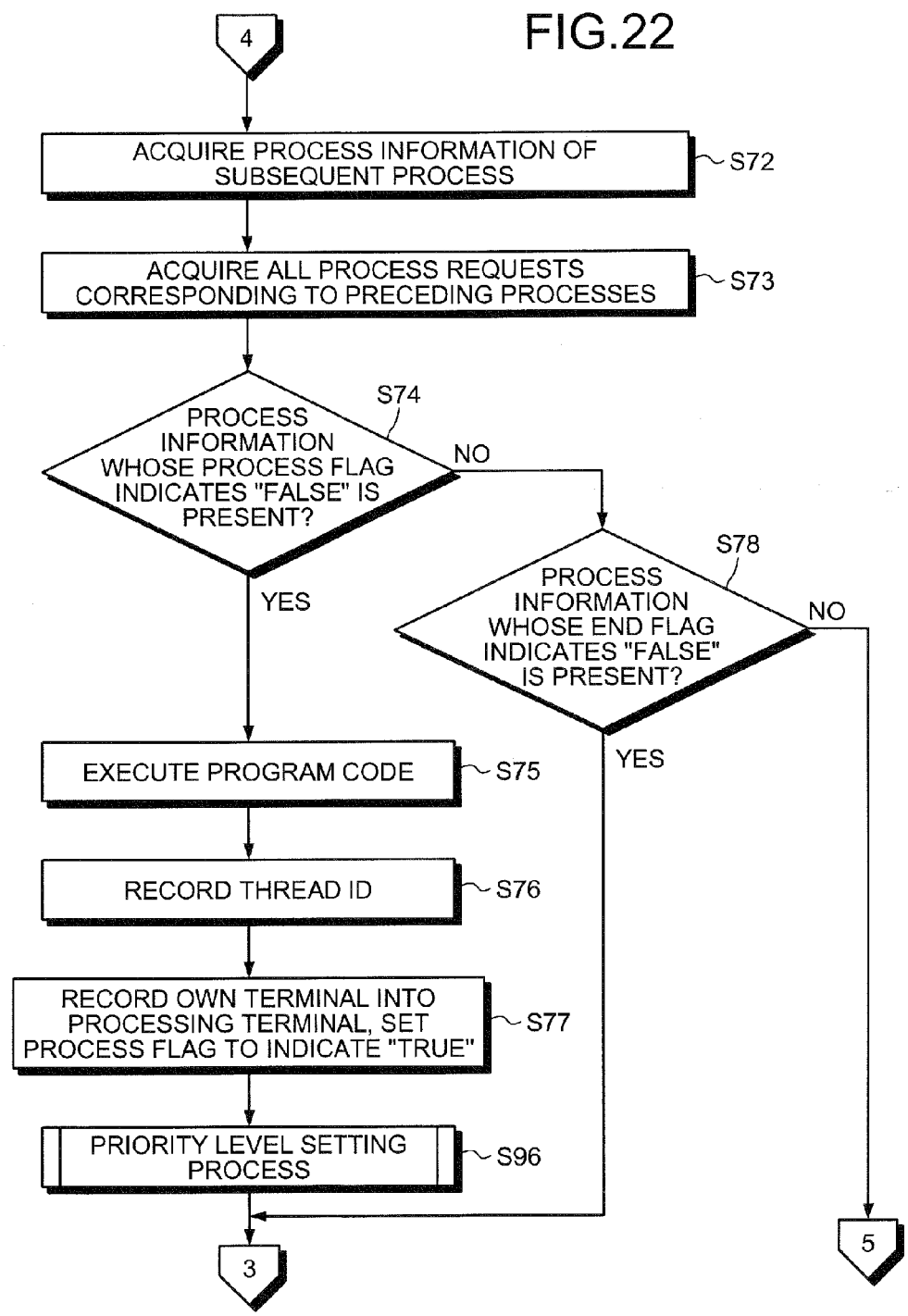
FIG. 22 is a flowchart continued from that of FIG. 15 of the operation executed when the barrier process is executed by the terminal, according to the third embodiment.

FIG. 22 is a flowchart continued from that of FIG. 15 of the operation executed when the barrier process is executed by the terminal, according to the third embodiment. In the third embodiment, for the operation executed when the barrier process is executed described with reference to FIGS. 15 to 18 in the second embodiment, the barrier processing unit 57 executes the operation whose portion corresponding to the flowchart depicted in FIG. 16 is replaced by the flowchart depicted in FIG. 22. Only the points that differ from the second embodiment will be described. Therefore, the flowcharts depicted in FIGS. 17 and 18 will not again be described.

Steps S61 to S67 and S72 to S77 are same as those described in the second embodiment. As depicted in FIG. 22, if the plural threads are started up at steps S61 to S67 and S72 to S77 as depicted in FIG. 22, the barrier processing unit 57 executes the priority level setting process (step S96) and progresses to the process at step S79 of FIG. 17. The other operations executed when the barrier process is executed are same as those described in the second embodiment.

Figure 23:
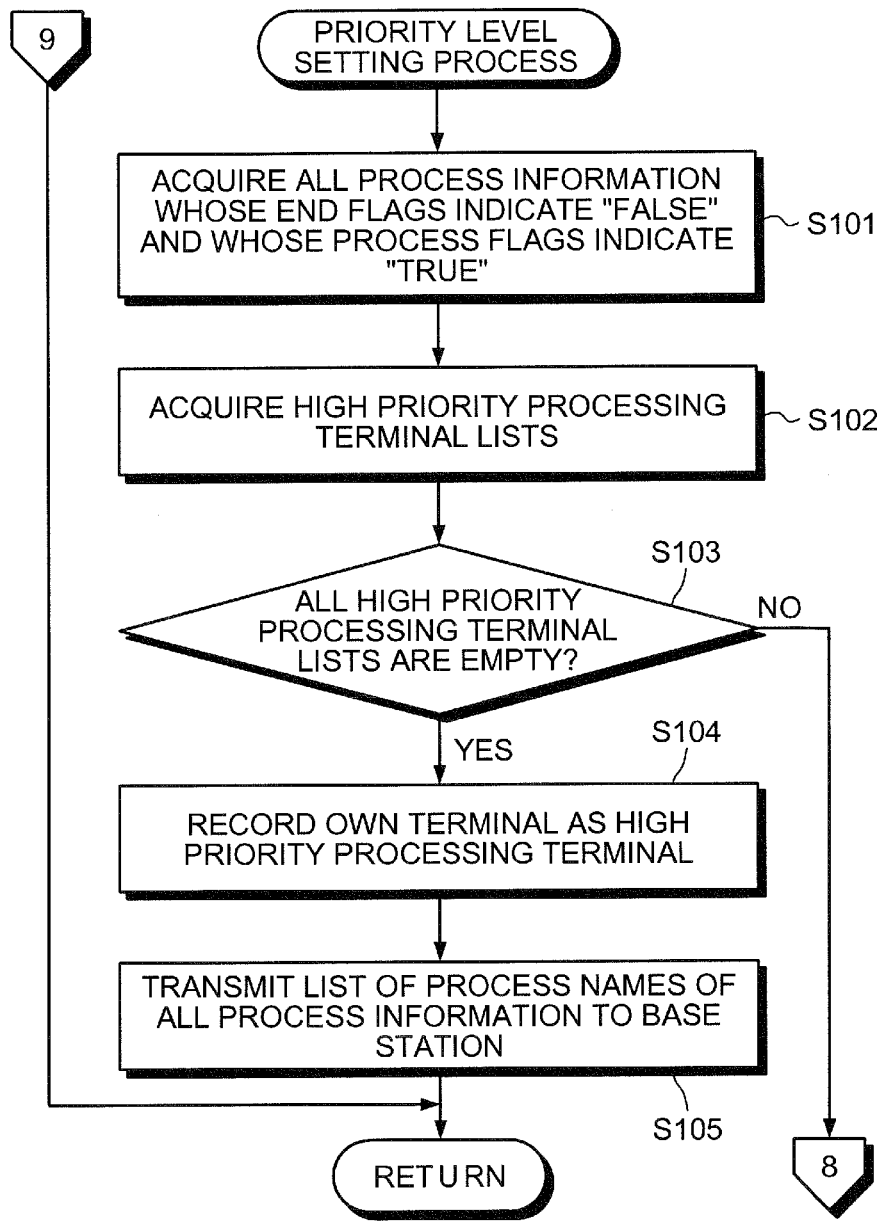
FIG. 23 is a flowchart of an operation executed when a priority level setting process is executed by the terminal, according to the third embodiment.
Figure 24:
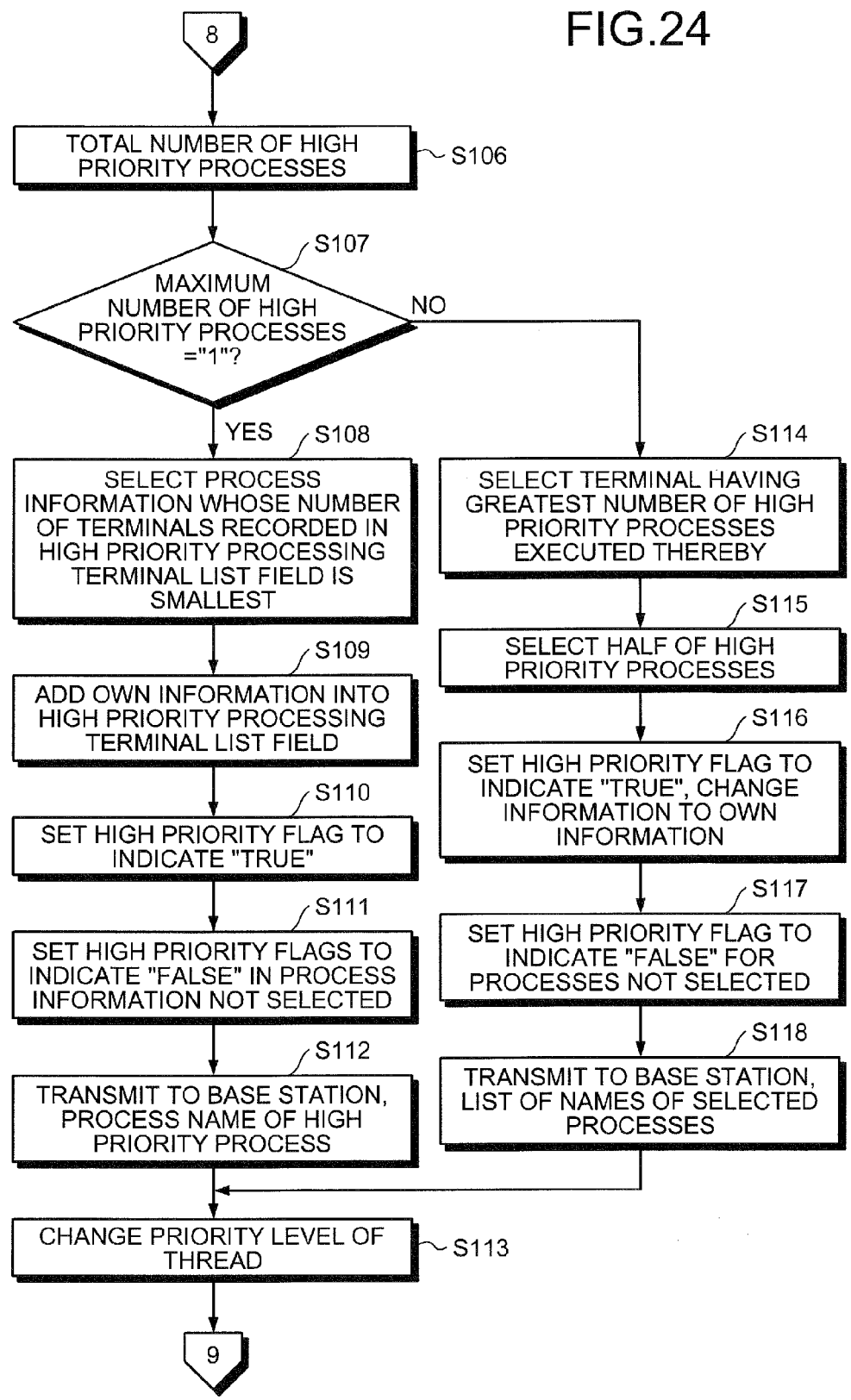
FIG. 24 is a flowchart continued from that of FIG. 23.

FIG. 23 is a flowchart of an operation executed when the priority level setting process is executed by the terminal 51, according to the third embodiment. FIG. 24 is a flowchart continued from that of FIG. 23.

As depicted in FIG. 23, when the priority level setting process is started up, the terminal 51 acquires all the process information 61 whose end flags indicate "false" and whose process flags indicate "true", from the process information 61 expanded in the memory 54 (step S101) and acquires the high priority processing terminal lists of the process information 61 acquired at step S101 (step S102).

The terminal 51 checks whether the high priority processing terminal lists acquired at step S102 are empty. If the terminal 51 determines that all the high priority processing terminal lists are empty (step S103: YES), no terminal currently executes the process at the high priority, other than the terminal. Therefore, the terminal 51 can recognize that the terminal first completing the process assigned thereto is the terminal 51.

If the terminal 51 recognizes that the terminal first completing the process assigned thereto is the terminal 51 the terminal 51 records the information concerning the terminal 51 into the high priority processing terminal list field of all the process information 61 acquired at step S101 (step S104). Thereby, the terminal 51 first completing the process assigned thereto executes, at the high priority, all the processes to be speculatively executed.

The terminal 51 produces a list of information concerning the process names of all the process information 61 acquired at step S101 and transmits the list to the base station (step S105). The base station appends the terminal name that is the transmission source of the list to the process name information list and distributes the process name information list all at once. The terminal 51 returns to the process executed when the process result is received; or the barrier process.

On the other hand, if the terminal 51 determines that all the high priority processing terminal list are not empty (step S103: NO), the terminal 51 as depicted in FIG. 24 totals the number of processes executed at the high priority, for each terminal and based on all the process information 61 acquired at step S101 (step S106) and checks whether the maximum value of the number of processes to be executed at the high priority, totaled at step S106 is "one".

If the terminal 51 determines that the maximum value of the number of processes to be executed at the high priority is "one" (step S107: YES), the terminal 51 selects the process information 61 whose number of terminals recorded in the high priority processing terminal list field is the smallest, from the process information 61 acquired at step S101 (step S108) and adds information of the terminal 51 into the high priority processing terminal list field of the process information 61 selected at step S108 (step S109).

The terminal 51 sets the high priority flag to indicate "true" in the process information 61 selected at step S108 (step S110) and sets the high priority flags to indicate "false" in the process information 61 excluding that selected at step S108, of the process information 61 acquired at step S101 (step S111). Either of steps S110 and S111 may be executed prior to the other.

If the number of terminals each executing the speculative execution exceeds the number of processes to be speculatively executed consequent to steps S108 to S111, the priority levels are set such that the high priority processes are evenly executed.

The terminal 51 transmits to the base station, the information concerning the process name of the process information 61 selected at step S108, that is, the process name of the process to be processed at the high priority (step S112). The base station appends the terminal name of the transmission source of the process name to the information concerning the process name and distributes the information concerning the process name all at once. The terminal 51 changes the priority level of the thread executing the process of the process information 61 acquired at step S101, based on the value of the high priority flag set at steps S110 and S111 (step S113). The terminal 51 returns to the process executed when the process result is received; or the barrier process.

On the other hand, if the terminal 51 determines that the maximum value of the number of processes to be executed at the high priority is not "one" (step S107: NO), the terminal 51 selects the terminal having the greatest number of processes executed thereby at the high priority, among the numbers totaled for each terminal (step S114) and selects processes of a number that is an arbitrary half or a substantially half of the number of processes that are determined for the terminal selected at step S114 to execute at the high priority (step S115).

The terminal 51 sets the high priority flag to indicate "true" in the process information 61 corresponding to the processes selected at step S115, changes the information concerning a terminal recorded in the high priority processing terminal list field to the information concerning the terminal 51 (step S116), and sets the high priority flag to indicate "false" in the process information 61 corresponding to the processes other than the processes selected at step S115, of the process information 61 acquired at step S101 (step S117). Either of steps S116 and S117 may be executed prior to the other.

Based on steps S114 to S117, like, for example, the first half of the terminals #1 to #3 of the example depicted in FIG. 19, the priority levels are set such that: an arbitrary half of the processes is selected from the processes for the terminal having the greatest number of processes executed thereby at the high priority; and the selected processes are processed by the terminal 51 at the high priority.

The terminal 51 transmits to the base station, the list of the process names of the processes selected at step S115 (step S118). The base station attaches the terminal name of the transmission source of the list to the process name list and distributes the process name list all at once. The terminal 51 changes based on the value of the high priority flag set at steps S116 and S117, the priority level of the thread executing the processes of the process information 61 acquired at step S101 (step S113). The terminal 51 returns to the process executed when the process result is received; or the barrier process.

The process name is transmitted to the base station at steps S105, S112, and S118 and thereby, the information can be shared among the terminals executing the parallel processing. Therefore, for example, even when a terminal is present that becomes unable to communicate during speculative execution of a process, the process currently executed at the high priority by the corresponding terminal can be known from another terminal that shares the information. The operation executed when the terminal receives the information concerning the process name simultaneously distributed from the base station (the operation executed when the high priority process name list is received) will be described next.

Figure 25:
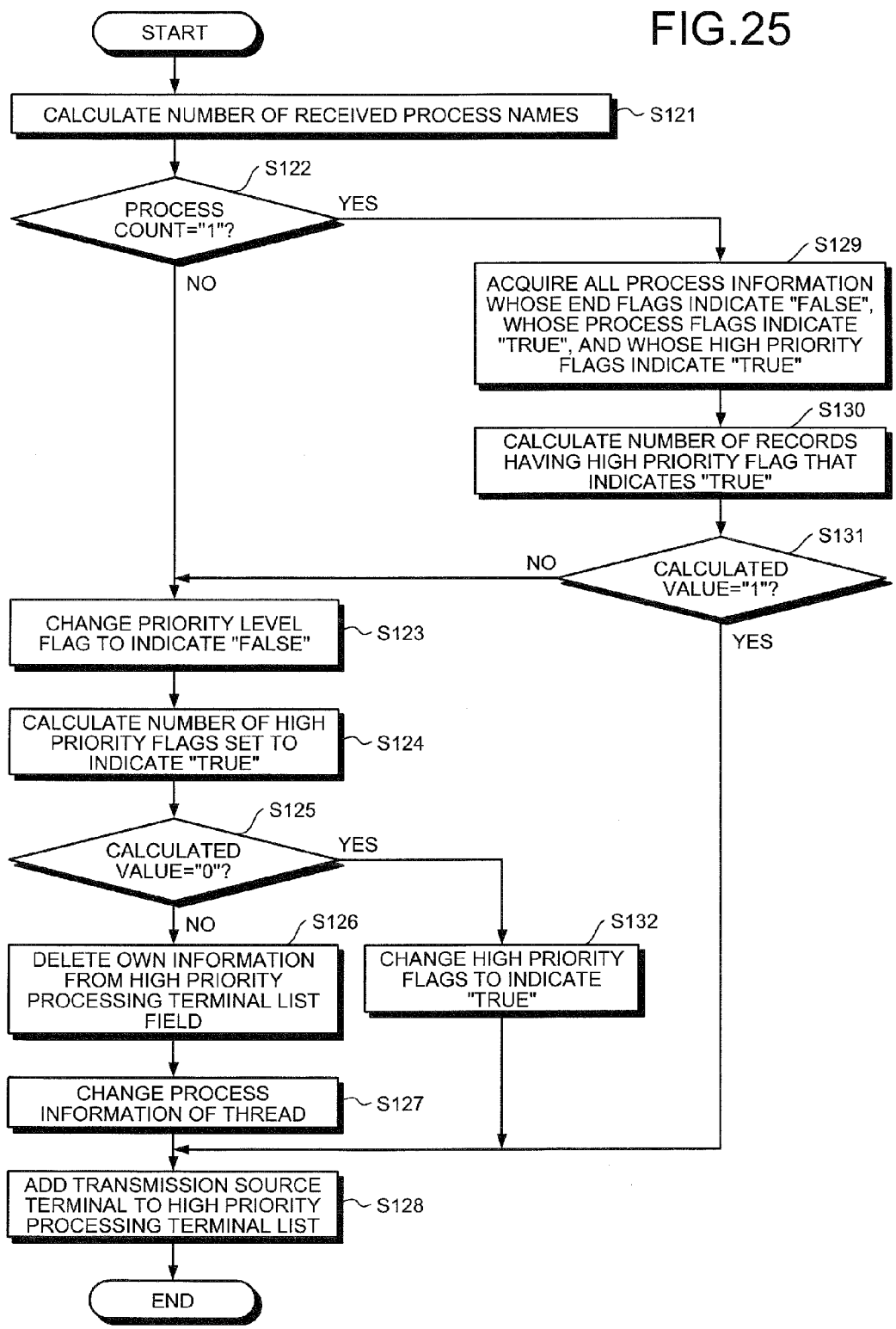
FIG. 25 is a flowchart of operation executed when a high priority process name list is received by the terminal, according to the third embodiment.

FIG. 25 is a flowchart of the operation executed when the high priority process name list is received by the terminal, according to the third embodiment. When the terminal 51 receives the information concerning the process name simultaneously distributed from the base station, the terminal 51 starts the operation executed when the high priority process name list is received.

As depicted in FIG. 25, when the terminal 51 starts the operation executed when the high priority process name list is received, the terminal 51 calculates the number of received process names (step S121) and checks whether the number of received process names is one. If the terminal 51 determines that the number of received process names is not one (step S122: NO), the number of speculatively executed processes exceeds the number of terminals executing the speculative execution.

One terminal basically can process one process at the high priority. Therefore, when the terminal 51 currently processes, at the high priority, the process of the received process name, the terminal 51 changes the priority level of the process executed at the high priority thereby to the low priority and changes the high priority flags of the process information 61 corresponding to all the received process names to indicate "false" (step S123).

In the above, for example, in the example depicted in FIG. 19, it is assumed that the timing at which the terminal #2 completes the thread #2 and the timing at which the terminal #3 completes the thread #3 are same as each other. In this case, the terminals #2 and #3 determine that the terminals #2 and #3 execute, at the high priority, processing of the threads #5 and #6 executed at the high priority by the terminal #1, and transmit the process names to the base station. When the terminals #2 and #3 each receive the information concerning the process name simultaneously distributed from the base station, the received information concerning the process name includes the processing of each of the threads #5 and #6 to be executed at the high priority by the terminals #2 and #3.

Therefore, at step S123, the terminals #2 and #3 change the priority levels of the processes of the threads #5 and #6 to be executed at the high priority by the terminals #2 and #3 to the low priority and therefore, no process is present for the terminals #2 and #3 to execute at the high priority. The terminal 51 changes the high priority flag to indicate "false" at step S123, thereafter, calculates the number of high priority flags set to indicate "true" in the process information 61 (step S124), and checks whether the calculated value is zero.

If the terminal 51 determines that the value calculated at step S124 is zero (step S125: YES), the terminal changes the high priority flags to indicate "true" in the process information 61 corresponding to all the received process names (step S132). Based on step S132, a case can be avoided where the priority level of the process to be executed by the terminal 51 is changed to the low priority at step S123 and therefore, no process is present for the terminal 51 to execute at the high priority.

The terminal 51 adds the information concerning the transmission source terminal of the information concerning the corresponding process name to the high priority processing terminal list field of the process information 61 corresponding to the received process name (step S128) and ends the series of process steps of the operation executed when the high priority process name list is received.

On the other hand, if the terminal 51 determines that the value calculated at step S124 is not zero (step S125: NO), the terminal 51 deletes the information concerning the terminal 51, from the high priority processing terminal list field of the process information 61 whose high priority flag is changed to indicate "false" at step S123 (step S126). When a thread is present corresponding to the process information 61 whose high priority flag is changed to indicate "false" at step S123, the terminal 51 changes the priority level of the process information of the corresponding thread to the low priority (step S127).

The terminal 51 adds the information concerning the transmission source terminal of the information concerning the corresponding process name to the high priority processing terminal list field of the process information 61 corresponding to the received process name (step S128) and ends the series of process steps of the operation executed when the high priority process name list is received. Based on steps S123, S126, and S128, the terminal 51 can execute at the low priority, the process corresponding to the received process name; and the transmission source terminal of the information concerning the corresponding process name can execute the process at the high priority.

On the other hand, if the terminal 51 determines that the result of the calculation at step S121 is one (step S122: YES), the terminal 51 acquires from the memory 54, all the process information 61 whose end flags indicate "false", whose process flags indicate "true", and whose high priority flags indicate "true" (step S129) and calculates the number of records of process information 61 acquired at step S129, that is, the number of high priority flags that indicate "true" in the process information 61 (step S130).

If the calculation result at step S130 is one (step S131: YES), the number of terminals executing the speculative execution exceeds the number of processes to be speculatively executed, or the terminal 51 does not execute, at the high priority, any process corresponding to the received process name. Therefore, the terminal 51 adds the information concerning the transmission source terminal of the information concerning the corresponding process name, to the high priority processing terminal list field of the process information 61 corresponding to the received process name (step S128) and ends the series of process steps of the operation executed when the high priority process name list is received.

On the other hand, if the calculation result at step S130 not one (step S131: NO), the number of processes to be speculatively executed exceeds the number of terminals currently executing the speculative execution. Therefore, in this case, the operations executed at steps S123 and thereafter are executed, and the terminal 51 executes, at the low priority, the process corresponding to the received process name; and the transmission source terminal of the information concerning the corresponding process name executes the process, at the high priority.

According to the third embodiment, the same effect as that of the second embodiment is achieved, and efficient speculative execution can be executed by setting the priority level in each of the processes to be speculatively executed.

According to the data processing method and the data processing system disclosed herein, an effect is achieved that parallel processing may be executed promptly using plural terminals.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A data processing method that is executed by a first data processing apparatus, the data processing method comprising:
    acquiring process information concerning a first process, in response to a process request for the first process;
    setting a first process flag included in the process information concerning the first process to indicate "true";
    setting a first end flag of the process information concerning the first process to indicate "true" after executing the first process;
    acquiring process information concerning a second process that is to be executed before a third process that is to be executed subsequent the first process; and
    determining a process to be executed, based on a second process flag and a second end flag included in the process information concerning the second process.

2. The data processing method according to claim 1, further comprising
    executing the second process when the second process flag indicates "false".

3. The data processing method according to claim 1, further comprising
    executing the third process when the second process flag indicates "true" and the second end flag included in the process information concerning the second process indicates "true".

4. The data processing method according to claim 1, further comprising
    refraining from executing the third process when the second process flag indicates "true" and the second end flag included in the process information concerning the second process indicates "false".

5. The data processing method according to claim 1, further comprising:
    receiving an execution result of the second process;
    acquiring the process information concerning the second process; and
    updating processing apparatus information included in the process information concerning the second process, when the processing apparatus information indicates the first data processing apparatus, and the second end flag indicates "true".

6. The data processing method according to claim 1, further comprising:
    receiving an execution result of the second process;
    acquiring the process information concerning the second process; and
    suspending execution of the second process when processing apparatus information included in the process information concerning the second process indicates the first data processing apparatus, the second end flag indicates "false", and the second process flag indicates "true".

7. The data processing method according to claim 1, further comprising:
    receiving an execution result of the second process;
    acquiring the process information concerning the second process; and
    executing the third process when processing apparatus information included in the process information concerning the second process indicates the first data processing apparatus, the second end flag indicates "false", and the second process flag indicates "false".

8. The data processing method according to claim 1, further comprising:
    receiving an execution result of the second process;
    acquiring the process information concerning the second process; and
    executing a fourth process that is executed by a second data processing apparatus that executes a process of a high priority, the fourth process being executed when processing apparatus information included in the process information concerning the second process indicates the first data processing apparatus, and the second end flag indicates "false".

9. A data processing system comprising
    a processor configured to:
    receive process information concerning a first process, in response to a process request for the first process; and
    set a first process flag included in the process information concerning the first process to indicate "true" and after executing the first process, set a first end flag of the process information concerning the first process to indicate "true", acquire process information concerning a second process that is to be executed before a third process that is to be executed subsequent the first process, and execute the third process based on a second process flag included in the process information concerning the second process.

10. A data processing system comprising:
    a processor configured to:
        transmit to a plurality of data processing apparatuses, a process request requesting execution of a process, and acquire an execution result of the process from at least one of the data processing apparatuses; and
    a storing unit that stores a process flag indicating that execution of the process is being performed, an end flag indicating that the execution of the process has ended, information indicating the data processing apparatus executing the process, and information indicating a preceding process that is to be executed before the process, correlated with the process.

11. The data processing system according to claim 10, wherein the processor is further configured to change upon receiving the execution result, the process flag to indicate "true", when the end flag corresponding to the process indicates "false".

12. The data processing system according to claim 10, wherein the storing unit stores a priority flag that indicates a priority level of the execution of the process.

* * * * *